United States Patent
Mitsuzawa

(10) Patent No.: US 6,447,098 B2
(45) Date of Patent: Sep. 10, 2002

(54) PRINTING IN SELECTED RECORD MODE WITH REDUCED DISPLACEMENT OF RASTER LINES

(75) Inventor: Toyohiko Mitsuzawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 47 days.

(21) Appl. No.: 09/853,693

(22) Filed: May 14, 2001

(30) Foreign Application Priority Data

May 16, 2000 (JP) ........................................ 2000-143254

(51) Int. Cl.$^7$ ................................................. B41J 2/15
(52) U.S. Cl. .............................. 347/40; 347/12; 347/14
(58) Field of Search .............................. 347/40, 12, 14, 347/41, 15, 43, 16; 358/1.2, 1.5, 1.13

(56) References Cited

U.S. PATENT DOCUMENTS

| | | | |
|---|---|---|---|
| 6,170,932 B1 * | 1/2001 | Kanaya et al. ................. | 347/41 |
| 6,203,134 B1 * | 3/2001 | Kakutani et al. .............. | 347/15 |
| 6,318,830 B1 * | 11/2001 | Sugishima ..................... | 347/12 |

FOREIGN PATENT DOCUMENTS

| | | |
|---|---|---|
| EP | 0 925 920 | 6/1999 |
| EP | 0 982 139 | 3/2000 |
| GB | 2 311 601 | 10/1997 |

* cited by examiner

Primary Examiner—Lamson D. Nguyen
(74) Attorney, Agent, or Firm—Oblon, Spivak, McClelland, Maier & Neustadt, P.C.

(57) ABSTRACT

The technique of the present invention enables a desired dot record mode to be readily set for an individual dot recording apparatus. The procedure generates first displacement data, which represents deviations of dot recording position in a sub-scanning direction intrinsic to respective dot forming elements, as well as second displacement data, which represents errors of sub-scan feed. The procedure then selects a desired dot record mode among a plurality of dot record modes having identical resolution and recording speed but different combinations of feeding amounts of sub-scan, based on the first displacement data and the second displacement data. The dot recording apparatus then carries out main scan and sub-scan with a dot record head to record dots on a printing medium in the selected dot record mode.

22 Claims, 23 Drawing Sheets

Scanning Parameters
Nozzle pitch k : 4[dot]
Number of working nozzles N : 8
Number of scan repeats s : 1
Number of effective nozzles Neff : 8

Fig. 6A

Scanning Parameters
    Nozzle pitch k : 4 [dot]
    Number of working nozzles N : 8
    Number of scan repeats s : 1
    Number of effective nozzles Neff : 8

| Passes of sub-scan feeds | 0 | 1 | 2 | 3 | 4 |
|---|---|---|---|---|---|
| Feeding amounts L [dot] | 0 | 10 | 7 | 6 | 9 |
| $\Sigma L$ | 0 | 10 | 17 | 23 | 32 |
| $F = (\Sigma L) \% k$ | 0 | 2 | 1 | 3 | 0 |

Fig. 6B

```
              Passes of sub-scan feeds
Nozzles   0    1    2    3    4    5    6    7
   #0:    .    .    .    4   13   23   30  (36)
   #1:    .    .    2    8   17   27  (34) (40)
   #2:    .    .    6   12   21   31  (38) (44)
   #3:    .    3   10   16   25  (35) (42) (48)
   #4:    .    7   14   20   29  (39) (46) (52)
   #5:    1   11   18   24  (33) (43) (50) (56)
   #6:    5   15   22   28  (37) (47) (54) (60)
   #7:    9   19   26   32  (41) (51) (58) (64)
```

Fig. 7

| Raster lines | @ | Δ | \multicolumn{7}{c}{Passes of sub-scan feeds} |
|---|---|---|---|---|---|---|---|---|---|
| | | | 0 | 1 | 2 | 3 | 4 | 5 | 6 |
| 1 | · | – | #5 | | | | | | |
| 2 | X | 2 | | | #1 | | | | |
| 3 | · | – | | #3 | | | | | |
| 4 | X | 3 | | | | #0 | | | |
| 5 | · | – | #6 | | | | | | |
| 6 | X | 2 | | | #2 | | | | |
| 7 | · | – | | #4 | | | | | |
| 8 | X | 3 | | | | #1 | | | |
| 9 | · | – | #7 | | | | | | |
| 10 | X | 2 | | | #3 | | | | |
| 11 | · | – | | #5 | | | | | |
| 12 | ↑ | 2 | | | | #2 | | | |
| 13 | X | 2 | | | | | #0 | | |
| 14 | ↓ | 1 | | | #4 | | | | |
| 15 | · | – | | #6 | | | | | |
| 16 | ↑ | 2 | | | | #3 | | | |
| 17 | X | 2 | | | | | #1 | | |
| 18 | ↓ | 1 | | | #5 | | | | |
| 19 | · | – | | #7 | | | | | |
| 20 | ↑ | 2 | | | | #4 | | | |
| 21 | X | 2 | | | | | #2 | | |
| 22 | · | – | | | #6 | | | | |
| 23 | X | 3 | | | | | | #0 | |
| 24 | · | – | | | | #5 | | | |
| 25 | X | 2 | | | | | #3 | | |
| 26 | · | – | | | #7 | | | | |
| 27 | X | 3 | | | | | | #1 | |
| 28 | · | – | | | | #6 | | | |
| 29 | ↑ | 1 | | | | | #4 | | |
| 30 | X | 2 | | | | | | | #0 |
| 31 | ↓ | | | | | | | #2 | |

Fig. 8A

Scanning Parameters
- Nozzle pitch k : 4 [dot]
- Number of working nozzles N : 8
- Number of scan repeats s : 1
- Number of effective nozzles Neff : 8

| Passes of sub-scan feeds | 0 | 1 | 2 | 3 | 4 |
|---|---|---|---|---|---|
| Feeding amounts L [dot] | 0 | 7 | 6 | 9 | 10 |
| $\Sigma L$ | 0 | 7 | 13 | 22 | 32 |
| $F = (\Sigma L) \% k$ | 0 | 3 | 1 | 2 | 0 |

Fig. 8B

```
           Passes of sub-scan feeds
Nozzles   0    1    2    3    4    5    6    7
  #0:     .    .    .    4    14   21   27  (36)
  #1:     .    .    .    8    18   25   31  (40)
  #2:     .    .    3    12   22   29  (35)
  #3:     .    1    7    16   26  (33)
  #4:     .    5    11   20   30  (37)
  #5:     2    9    15   24  (34)
  #6:     6    13   19   28  (38)
  #7:    10    17   23   32  (42)
```

Fig.9

|  |  |  | Passes of sub-scan feeds | | | | | | |
|---|---|---|---|---|---|---|---|---|---|
| Raster lines | @ | Δ | 0 | 1 | 2 | 3 | 4 | 5 | 6 |
| 1 | ↓ | 1 | . | #3 |  |  |  |  |  |
| 2 | · | – |  | #5 |  |  |  |  |  |
| 3 | ↑ | 2 | . | . | #2 |  |  |  |  |
| 4 | X | 2 | . | . | . | #0 |  |  |  |
| 5 | ↓ | 1 | . | #4 |  |  |  |  |  |
| 6 | · | – |  | #6 |  |  |  |  |  |
| 7 | ↑ | 2 | . | . | #3 |  |  |  |  |
| 8 | X | 2 | . | . | . | #1 |  |  |  |
| 9 | ↓ | 1 | . | #5 |  |  |  |  |  |
| 10 | · | – |  | #7 |  |  |  |  |  |
| 11 | ↑ | 2 | . | . | #4 |  |  |  |  |
| 12 | X | 2 | . | . | . | #2 |  |  |  |
| 13 | · | – | . | #6 |  |  |  |  |  |
| 14 | X | 3 | . | . | . | . | #0 |  |  |
| 15 | · | – | . | . | #5 |  |  |  |  |
| 16 | X | 2 | . | . | . | #3 |  |  |  |
| 17 | · | – | . | #7 |  |  |  |  |  |
| 18 | X | 3 | . | . | . | . | #1 |  |  |
| 19 | · | – | . | . | #6 |  |  |  |  |
| 20 | ↑ | 1 | . | . | . | #4 |  |  |  |
| 21 | X | 2 | . | . | . | . | . | #0 |  |
| 22 | ↓ | 2 | . | . | . | . | #2 |  |  |
| 23 | · | – | . | . | #7 |  |  |  |  |
| 24 | ↑ | 1 | . | . | . | #5 |  |  |  |
| 25 | X | 2 | . | . | . | . | . | #1 |  |
| 26 | · | – | . | . | . | #3 |  |  |  |
| 27 | X | 3 | . | . | . | . | . | . | #0 |
| 28 | · | – | . | . | . | #6 |  |  |  |
| 29 | X | 2 | . | . | . | . | . | #2 |  |
| 30 | · | – | . | . | . | #4 |  |  |  |
| 31 | X | 3 | . | . | . | . | . | . | #1 |
| 32 | · |  | . | . | . | #7 |  |  |  |

PRINTING IN SELECTED RECORD MODE WITH REDUCED DISPLACEMENT OF RASTER LINES

BACKGROUND OF THE INVENTION

1. Field of the Invention

The present invention relates to a technique of recording dots on the surface of a printing medium, so as to print an image.

2. Description of the Related Art

Typical examples of the dot recording apparatus that records dots while scanning a dot record head in a main scanning direction and in a sub-scanning direction include serial scan printers and drum scan printers. Parameters defining the dot recording mode in such printers include the number of nozzles used for printing with regard to one color, the nozzle pitch, and the feeding amounts of sub-scan. One printer may adopts a plurality of different dot recording modes having different settings for some of these parameters.

Pixels, which are the measure for defining the dot recording position, are virtually arranged along the width and the length of a printing medium. An array of pixels arranged in the main scanning direction on the printing medium is called a raster line. For the high-quality printing result, it is desirable to record dots on the respective raster lines at equal intervals in the sub-scanning direction. The manufacturing error of an individual dot recording apparatus may, however, cause the dots on the respective raster lines to be not recorded at equal intervals in the sub-scanning direction. One proposed technique disclosed in JP10-337864A selects the dot recording mode suitable for each dot recording apparatus, which has a little variation in dot array interval in the sub-scanning direction, among a plurality of dot recording modes by taking into account the manufacturing error of the dot recording apparatus.

This prior art technique measures the distance between raster lines actually recorded in each dot recording mode and selects a desired dot recording mode based on the measurement results. This method records linear ruled lines on the raster lines with regard to all the possible combinations of nozzles that may record adjoining raster lines. The method of actually printing the ruled lines with regard to all the combinations of the nozzles and the sub-scan feeds in the respective dot recording modes is a heavy load and takes a significantly long time.

SUMMARY OF THE INVENTION

The object of the present invention is thus to provide a technique that enables a desired dot record mode to be readily set in an individual dot recording apparatus.

In order to attain at least part of the above and other objects, the present invention applies some technique to recording dots on a printing medium with a dot record head having a plurality of dot forming elements, which are used to form dots on the printing medium, by carrying out main scan and sub-scan, where the main scan shifts at least one of the dot record head and the printing medium in a main scanning direction and the sub-scan shifts at least one of the dot record head and the printing medium in a sub-scanning direction perpendicular to the main scanning direction. First displacement data is generated which substantially represents deviations of dot recording positions in the sub-scanning direction with respect to the plurality of dot forming elements from a reference dot recording position by a reference dot forming element selected among the plurality of dot forming elements. Second displacement data is also generated which substantially represents feeding errors of the sub-scan in the sub-scanning direction. Then a dot record mode is selected among a plurality of dot record modes, based on the first displacement data and the second displacement data, each of the dot record modes specifying operations of the main scan and the sub-scan to record dots, the plurality of dot record modes having a same dot resolution and a substantially same recording speed but different combinations of feeding amounts for the sub-scan carried out in respective intervals of adjoining passes of the main scan. Then the main scan and the sub-scan are carried out to record dots in the selected dot record mode.

This arrangement enables a deviation of dot recording position on each raster line to be checked easily without actually recording dots on the raster line. The optimum dot record mode is then selected, based on the information regarding the displacement of dot recording position.

When the dot record head is replaceable, it is preferable that the first displacement data is stored in the first storage unit provided on the dot record head. Even when the dot record head is replaced with a new one, this arrangement enables a desired dot record mode suitable for the new dot record head to be selected.

One applicable dot recording method carries out the sub-scan by a predetermined combination of feeding amounts in respective intervals of adjoining sub-scan feeds, so as to record dots on each raster line on the printing medium. In this dot recording method, it is preferable that the dot record mode is selected according to the procedure discussed below. A sum of accumulated feeding errors of the sub-scan and a deviation of a dot recording position in the sub-scanning direction is calculated. The accumulated feeding errors of the sub-scan is the errors with respect to each raster line of interest efore the raster line of interest on the printing medium is recorded. The deviation of a dot recording position in the sub-scanning direction is the deviation by a dot forming element used for recording the raster line of interest from the reference dot recording position. The sum is specified as a displacement of dot recording position on each raster line. A evaluation value relating to a variation in intervals of adjoining raster lines in the sub-scanning direction is calculated based on the displacement of dot recording position on each raster line on the printing medium, and selecting the dot record mode according to the evaluation value.

This arrangement enables the displacement of dot recording position to be calculated with high accuracy from the feeding errors of sub-scan and the deviation of the dot recording position with regard to the corresponding dot forming element.

It is preferable that the displacement of dot recording position is calculated with regard to an equal number of raster lines in each of the dot record modes. This application ensures the accurate evaluation of the displacement and the selection of the appropriate dot record mode even when the evaluation value is affected by the number of samples.

The displacement of dot recording position may be calculated with regard to raster lines to be recorded while one set of the sub-scan is carried out by the combination of feeding amounts for each dot record mode. When the respective feeding amounts of sub-scan included in the combination set for each dot record mode have intrinsic errors, the arrangement of calculating the displacement of dot recording position on each of the above raster lines ensures the appropriate evaluation of the displacement in each dot record mode.

The second displacement data may be generated according to the following procedure. The dot record head is shifted in a direction identical with the main scanning direction and recording dots with an identical dot forming element, while carrying out the sub-scan by the combination of feeding amounts in respective intervals of adjoining shifts, so as to record a sub-scan-induced displacement detection pattern in each dot record mode. The sub-scan-induced displacement detection pattern is read with a sensor. Then the second displacement data is generated based on an output of the sensor.

This application enables the feeding errors of sub-scan to be evaluated based on the actual printing result. Since the identical dot forming element is used to record dots, the net feeding errors of sub-scan can be evaluated adequately.

The first displacement data may be generated according to the following procedure. Each of the dot forming elements are driven while shifting the dot record head in a direction identical with the main scanning direction, so as to print a head-induced displacement detection pattern. The head-induced displacement detection pattern is read with a sensor. Then the first displacement data is generated based on an output of the sensor.

This application enables the deviations of the dot recording positions in the sub-scanning direction with regard to the respective dot forming elements to be evaluated based on the actual printing result. Since dots are recorded without any sub-scan, the net deviations of the dot recording positions intrinsic to the respective dot forming elements can be evaluated adequately.

The technique of the present invention may be actualized by any of various applications listed below:

(1) a printing apparatus and a printing control apparatus;
(2) a printing method, a printing control method, and a method of manufacturing the printing apparatus;
(3) a dot record head;
(4) a method of manufacturing the dot record head;
(5) a computer program for actualizing any of the above apparatuses and methods;
(6) a recording medium in which the computer program for actualizing any of the above apparatuses and methods is recorded; and
(7) a data signal that includes the computer program for actualizing any of the above apparatuses and methods and is embodied in a carrier wave.

These and other objects, features, aspects, and advantages of the present invention will become more apparent from the following detailed description of the preferred embodiments with the accompanying drawings.

BRIEF DESCRIPTION OF THE DRAWINGS

FIGS. 6A and 6B show scanning parameters in the first dot recording mode at k=4 and effective raster line numbers allocated to effective raster lines recorded with respective nozzles;

FIG. 7 shows nozzle numbers allocated to the nozzles used for recording the effective raster lines in the first dot recording mode at k=4;

FIGS. 8A and 8B show scanning parameters in a second dot recording mode at k=4 and effective raster line numbers allocated to effective raster lines recorded with respective nozzles;

FIG. 9 shows nozzle numbers allocated to the nozzles used for recording the effective raster lines in the second dot recording mode at k=4;

DESCRIPTION OF THE PREFERRED EMBODIMENTS

Embodiments of the present invention will be described in the following order:

A. Structure of Printing Apparatus
B. Various Dot recording modes
C. Manufacture of Printer (Method of Setting Displacement Data)
D. Another Method of Setting Displacement Data
E. Other Modifications

A. Structure of Printing Apparatus

Figure 1:
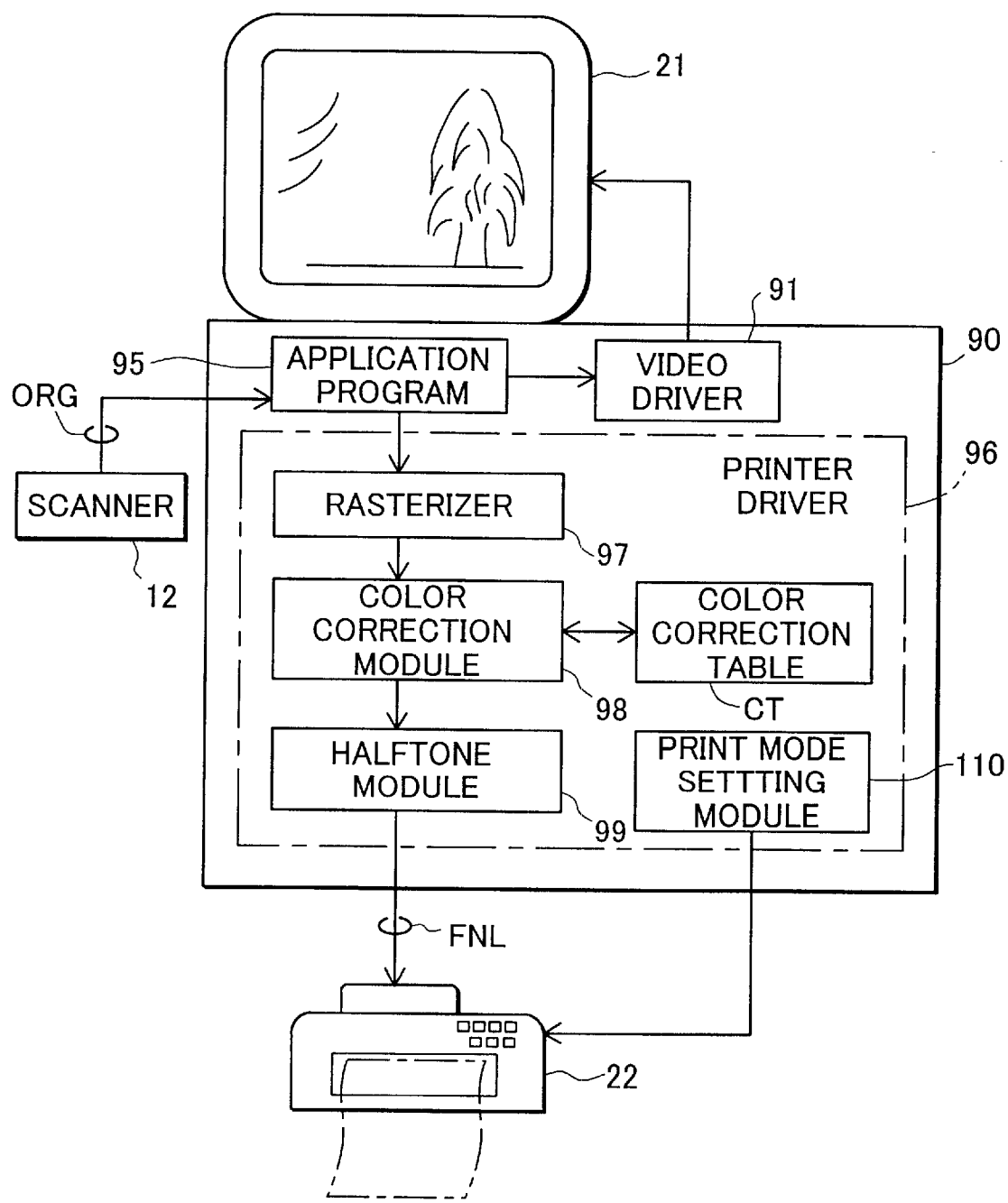
FIG. 1 is a block diagram illustrating the structure of an image processing system in one embodiment of the present invention.

FIG. 1 is a block diagram illustrating the structure of an image processing system in one embodiment of the present invention. The image processing system includes a scanner 12, a personal computer 90, and a color printer 22. The personal computer 90 has a color display 21. The scanner 12 reads color image data from a color original and supplies original color image data ORG composed of three color components, R, G, and B, to the computer 90.

The computer 90 includes a CPU, a RAM, and a ROM, and other constituents (none of them is shown). In the computer 90, an application program 95 works under the control of a predetermined operating system. A video driver 91 and a printer driver 96 are incorporated in the operating system. The application program 95 outputs final color image data FNL via these drivers 91 and 96. The application program 95, which carries out series of processing like generation and retouching of images, inputs an original image read by the scanner 12, makes the input image subject to a predetermined series of processing, and causes a resulting processed image to be displayed on the color display 21 via the video driver 91. In response to a printing instruction output from the application program 95, the printer driver 96 in the computer 90 receives image information from the application program 95 and converts the image information to signals printable by the printer 22 (in this embodiment, binarized signals with regard to the respective colors, C, M, Y, and K, used in the printer 22). In the structure of the embodiment shown in FIG. 1, the printer driver 96 includes a rasterizer 97 that converts color image data processed by the application program 95 to image data of a printing resolution, a color correction modules 98 that converts the image data to another image data including color components for the ink colors C, M, Y used in the printer 22, and a color correction table CT that is referred to by the color correction module 98. The printer driver 96 further includes a halftone module 99 that generates halftone image data, which expresses the density of the image according to the presence or absence of ink at each dot position, based on the color corrected image data. The printer driver 96 also includes a print mode setting module 110 that functions to write print mode selection information (discussed later) into a memory of the color printer 22.

Figure 2:
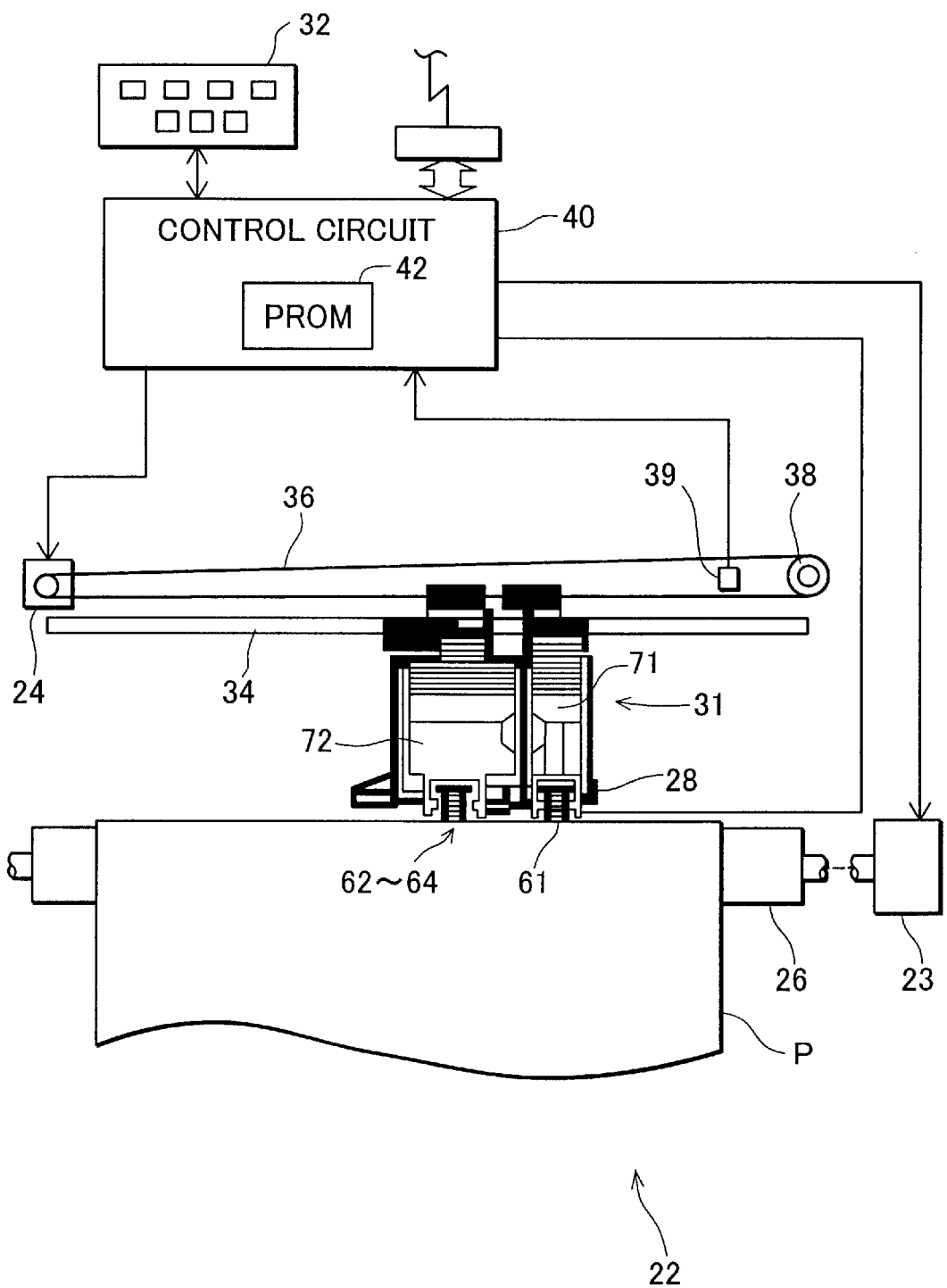
FIG. 2 schematically illustrates the structure of a color printer included in the image processing system.

FIG. 2 schematically illustrates the structure of the printer 22. The printer 22 has a sub-scan mechanism of driving a sheet feed motor 23 to feed a sheet of printing paper P, a main scan mechanism of driving a carriage motor 24 to move a carriage 31 forward and backward along an axis of a platen 26, a head driving mechanism of driving a print head 28 mounted on the carriage 31 to implement ink ejection and dot creation, and a control circuit 40 that controls transmission of signals to and from the sheet feed motor 23, the carriage motor 24, the print head 28, and a control panel 32.

A black ink cartridge 71 for black ink (K) and a color ink cartridge 72 in which three color inks, that is, cyan (C), magenta (M), and yellow (Y), are accommodated are detachably attached to the carriage 31 in the printer 22. A total of four ink ejection heads 61 through 64 are formed on the print head 28 that is disposed in the lower portion of the carriage 31. Ink conduits (not shown) are formed in the bottom of the carriage 31 to lead supplies of inks from ink reservoirs to the respective ink ejection heads. When the ink cartridges 71 and 72 are pressed down to the carriage 31, the ink conduits are fitted in connection ports formed in the respective ink cartridges, so that the supplies of the respective color inks are flown into the corresponding ink ejection heads 61 through 64.

Figure 3A:
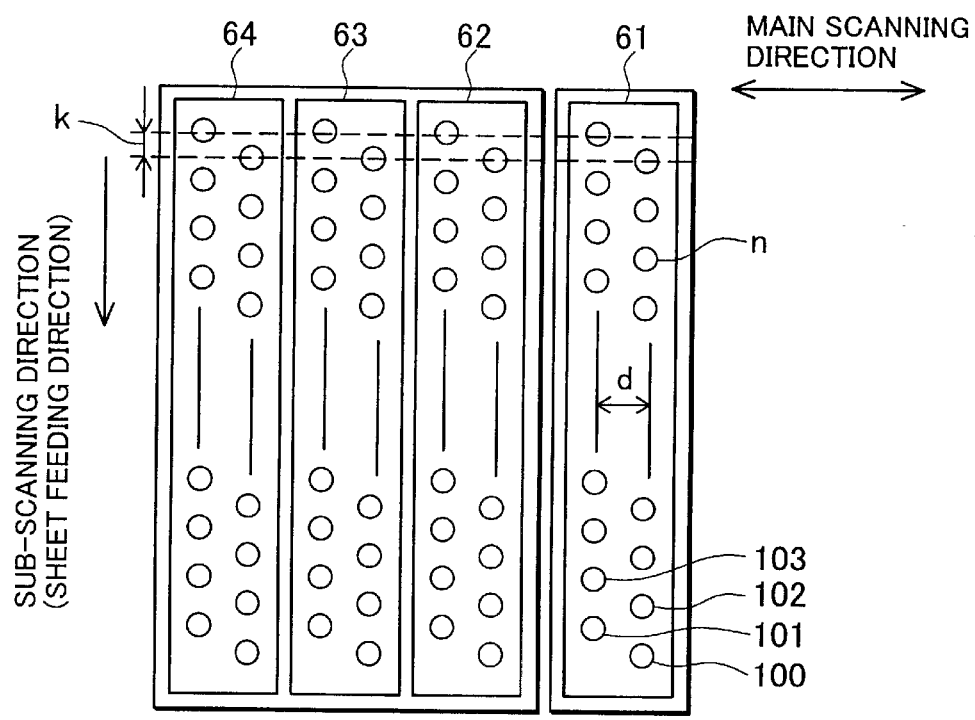
FIGS. 3A and 3B show an arrangement of ink jet nozzles on ink ejection heads of a print head in the color printer of FIG. 2.

FIG. 3A shows an arrangement of ink ejection nozzles in the respective ink ejection heads 61 through 64. The first ink ejection head 61 has a nozzle array for black ink. The second through the fourth ink ejection heads 62 through 64 respectively have nozzle arrays for cyan, magenta, and yellow inks. The four nozzle arrays are mounted at an identical sub-scanning position.

Figure 3B:

Each of the four nozzle arrays includes a plurality of nozzles (dot forming elements) n arranged in zigzag at a fixed nozzle pitch k in the sub-scanning direction. An ink particle Ip is ejected at a high speed from each nozzle n. The ink particles Ip soak into the printing paper P set on the platen 26, so as to form dots as shown in FIG. 3B and implement printing. The plurality of nozzles n included in each nozzle array may be arranged in alignment, instead of in zigzag. The zigzag arrangement shown in FIG. 3A, however, has an advantage that the nozzle array can be designed to have a small nozzle pitch k.

The printer 22 drives the sheet feed motor 23 to rotate the platen 26 and other related rollers to thereby feed the printing paper P. The printer 22 also drives the carriage motor 24 to move the carriage 31 back and forth, and simultaneously actuates piezoelectric elements provided in the respective ink ejection heads 61 through 64 of the print head 28 to eject the respective inks. These procedures enable a multi-color image to be printed on the printing paper P.

The mechanism of feeding the printing paper P has a gear train (not shown) that transmits the rotations of the sheet feed motor 23 to the platen 26 and a sheet feed roller (not shown). The mechanism of reciprocating the carriage 31 includes a sliding shaft 34 that is arranged in parallel with the axis of the platen 26 to support the carriage 31 in a slidable manner, a pulley 38 that is combined with the carriage motor 24 to support an endless drive belt 36 spanned therebetween, and a position sensor 39 that detects the carriage 31 at its reference position.

The control circuit 40 includes a programmable ROM (PROM) 42 as a rewritable non-volatile memory as shown in FIG. 2, in addition to a CPU and main memories like a ROM and a RAM (not shown). PROM 42 stores dot record mode information including parameters with regard to a plurality of dot record modes. Here the "dot record mode" represents a dot recording mode defined by the number of working nozzles N in each nozzle array actually used for printing and the sub-scan feed amount L. In the specification hereof, the term "recording process" is substantially synonymous with the terms "record mode" and "printing mode". Concrete examples of the dot record mode and their parameters will be discussed later. PROM 42 also stores print mode selection information, which is used to select a desired dot record mode among the plurality of dot record modes. For example, in the case where dot record mode information of 16 modes can be stored in the PROM 42, the print mode selection information is 4-bit data.

The dot record mode information is read from the PROM 42 by the printer driver 96 (see FIG. 1), when the printer driver 96 is installed on the start of the computer 90. The printer driver 96 reads the dot record mode information corresponding to a desired dot record mode specified by the print mode selection information from the PROM 42. The series of processing by the rasterizer 97 and the halftone module 99 and the main scan and sub-scan operations are carried out according to the input dot record mode information.

PROM 42 may be any rewritable non-volatile memory, and a diversity of non-volatile memories like an EEPROM and a flash memory may be applicable for the PROM 42. While it is preferable that the print mode selection information is stored in the rewritable non-volatile memory, the dot record mode information may be stored in a non-rewritable ROM. The dot record mode information may be stored in a storage unit other than the PROM 42 or may alternatively be registered in the printer driver 96.

Figure 4:
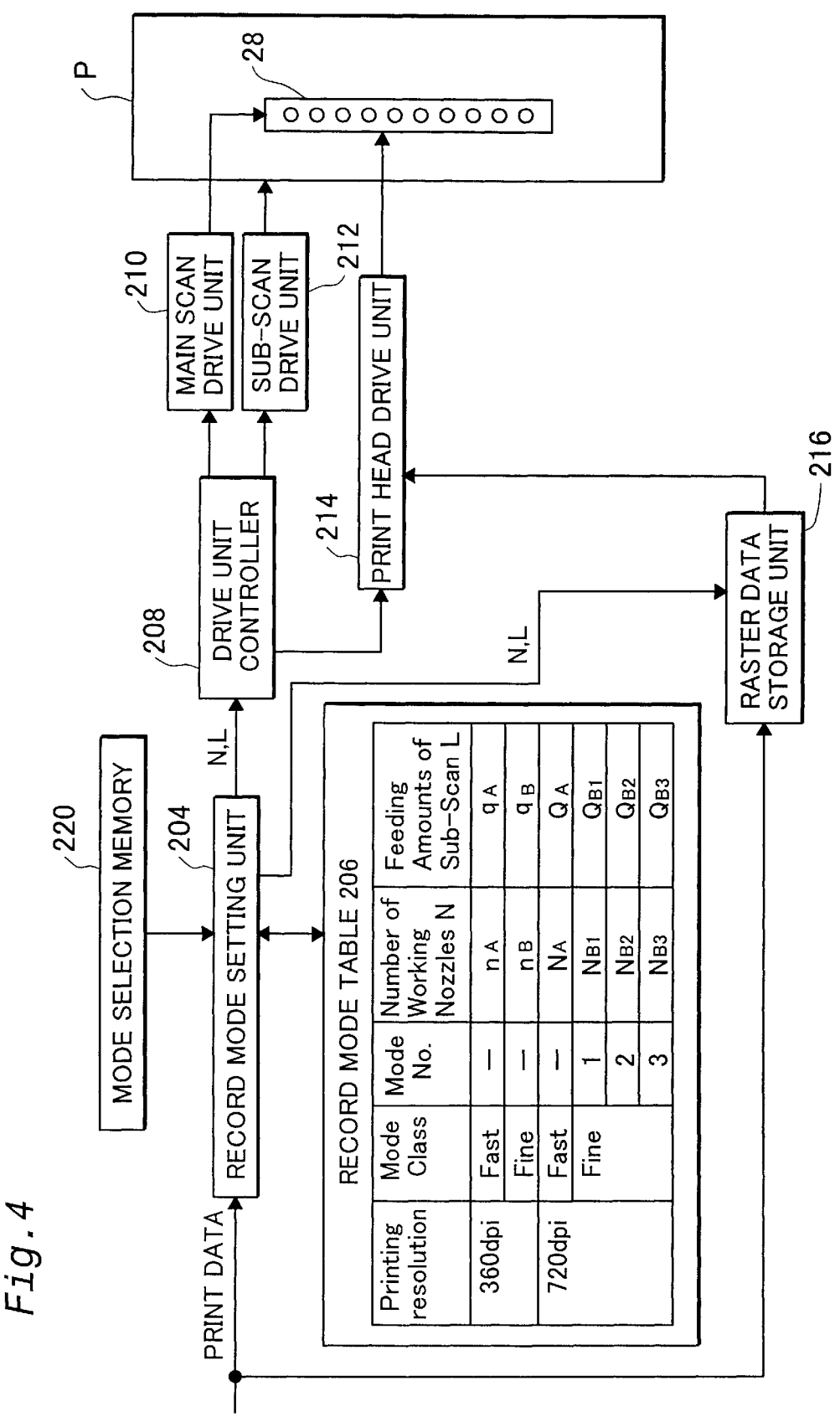
FIG. 4 is a functional block diagram showing the structure relating to drive control operations according to a dot record mode.

FIG. 4 is a functional block diagram showing the structure relating to drive control operations according to the dot record mode. The functional block diagram includes a mode selection memory 220, a record mode setting unit 204, a record mode table 206, a drive unit controller 208, a main scan drive unit 210, a sub-scan drive unit 212, a print head drive unit 214, a raster data storage unit 216, the print head 28, and the printing paper P. The mode selection memory 220 and the record mode table 206 respectively correspond to the third storage unit and the record mode storage unit of the present invention.

The mode selection memory 220 stores the print mode selection information that is used to specify a desired dot record mode. The record mode table 206 stores the dot record mode information representing a plurality of dot record modes. The dot record mode information includes a printing resolution, a mode class, a record mode number allocated to each record mode, the number of working nozzles N, and the sub-scan feed amount L. The printing resolution represents the resolution of dots recorded on the printing paper P. The mode class specifies one of the two classes "Fast" and "Fine". For example, the "Fine" mode class is an overlap record mode that causes each raster line to be recorded with a plurality of nozzles. The "Fast" mode class is not an overlap record mode and is the mode that causes each raster line to be recorded with each nozzle by one pass of the main scan. In the example of FIG. 4, three dot record modes are registered for the "720 dpi, Fine" mode. Record mode numbers 1, 2, and 3 are allocated to these dot record modes. The number of working nozzles N represents the number of nozzles actually used for printing. The sub-scan feed amount L represents the number of dot spaces by which the printing paper P is fed in the course of sub-scan. The dot record mode information also includes a variety of other parameters for specifying the main scan and sub-scan operations, although such parameters are omitted from the illustration of FIG. 4.

The record mode setting unit 204 sends parameters, which specify the main scan and sub-scan operations, to the drive unit controller 208 and the raster data storage unit 216 according to the print data transmitted from the computer 90 and the print mode selection information transmitted from the mode selection memory 220 in the PROM 42. The print data here is the same as the final color image data FNL shown in FIG. 1. A header portion (not shown) of the print data includes data representing the printing resolution and the mode class. The record mode setting unit 204 specifies the dot record mode used for printing, based on the printing resolution, the mode class, and the print mode selection information transmitted from the mode selection memory 220. The plural dot record modes as possible options are registered only for the "720 dpi, Fine" mode in the example of FIG. 4. As for the other combinations of the mode class and the printing resolution, one dot record mode is specified only based on the printing resolution and the mode class regardless of the print mode selection information.

The record mode setting unit 204 transmits the scanning parameters, which include the number of working nozzles N and the sub-scan feed amount L, with regard to the dot record mode thus specified to the drive unit controller 208 and the raster data storage unit 216. As discussed later, the number of working nozzles N and the sub-scan feed amount L may be varied on each pass of the scan. The scanning parameters including the number of working nozzles N and the sub-scan feed amount L are thus transmitted to the drive unit controller 208 and the raster data storage unit 216, prior to each pass of the main scan.

The raster data storage unit 216 stores the print data into a non-illustrated buffer memory according to the scanning parameters including the number of working nozzles N and the sub-scan feed amount L. The drive unit controller 208 controls the main scan drive unit 210, the sub-scan drive unit 212, and the print head drive unit 214 according to these scanning parameters including the number of working nozzles N and the sub-scan feed amount L.

The record mode table 206 and the mode selection memory 220 are provided in the PROM 42. The record mode setting unit 204, the drive unit controller 208, and the raster data storage unit 216 are provided in the control circuit 40 shown in FIG. 2. The main scan drive unit 210 is actualized by the feeding mechanism of the carriage 31 including the carriage motor 24 shown in FIG. 2. The sub-scan drive unit 212 is actualized by the feeding mechanism of the printing paper P including the sheet feed motor 23. The print head drive unit 214 is actualized by a circuit including piezoelectric elements allocated to the respective nozzles.

B. Various Dot Recording Modes

Figure 5:
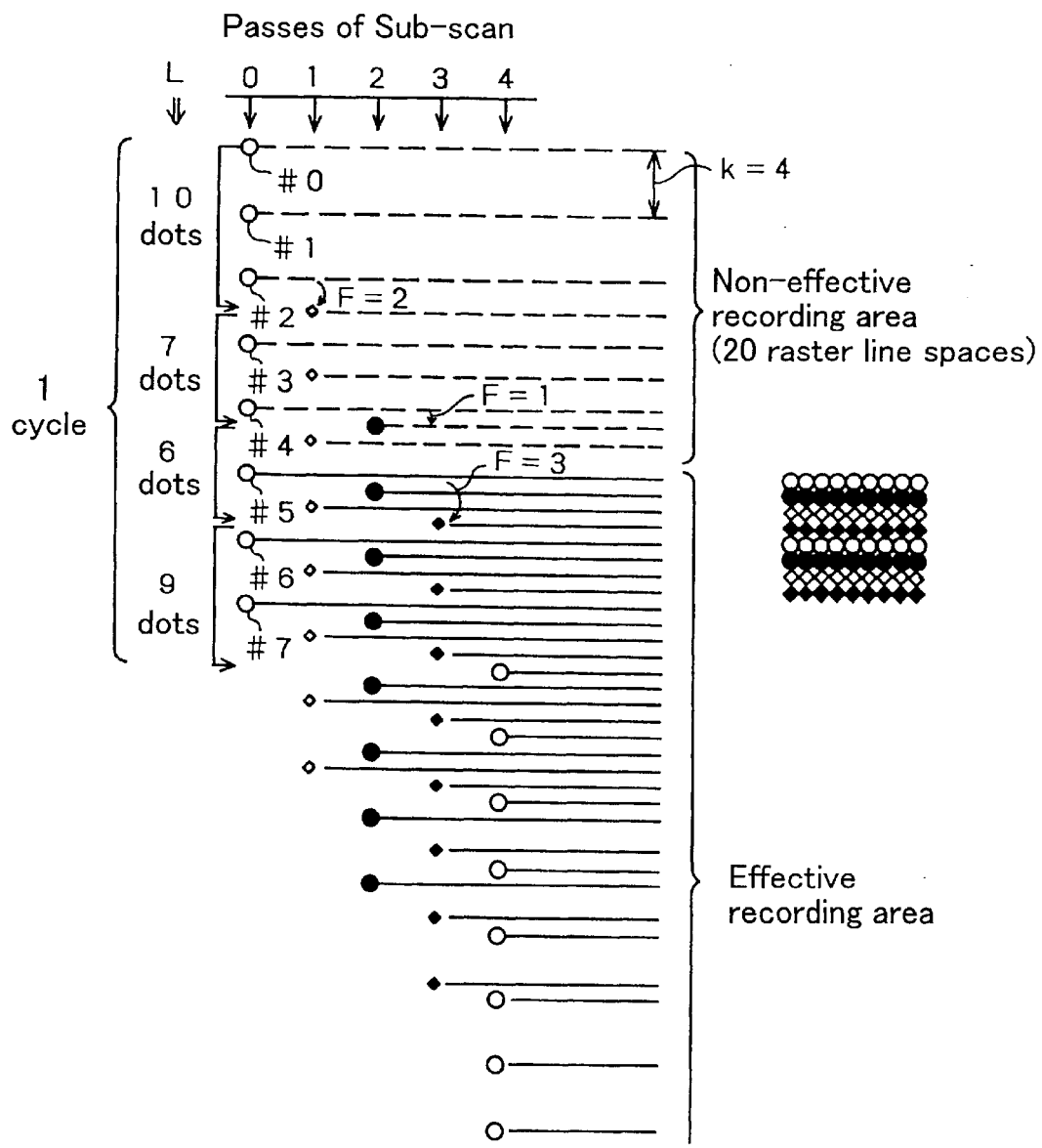
FIG. 5 shows a first dot recording mode at k=4.

FIG. 5 shows a first dot recording mode at the dot pitch k equal to 4 dots. The scanning parameters in the first dot recording mode are the nozzle pitch k=4 dots, the number of working nozzles N=8, the number of scan repeats s=1, and the number of effective nozzles Neff=8 as shown in the bottom of FIG. 5. The number of sub scan feeds s denotes the number of main scan passes performed to complete dot formation on each raster line. The number of effective nozzles Neff is obtained by dividing the number of working nozzles N by the numbers of scan repeats s.

In the example of FIG. 5, nozzle numbers #0 through #7 are sequentially allocated to the eight working nozzles. In the first dot recording mode at k=4, one cycle includes four sub-scan feeds that respectively have the sub-scan feed amount L of 10, 7, 6, and 9 dots. Namely a plurality of different values are set to the sub-scan feed amount L in one cycle of sub-scan feeds. The positions of the eight working nozzles after the respective sub-scan feeds are shown by four different symbols. The right side drawing of FIG. 5 shows the dots on respective raster lines in an effective recording area recorded with the nozzles after the respective sub-scan feeds. The effective recording area denotes an area in which all raster lines can be recorded without any line skip. In contrast, an areas in which some raster line cannot recorded is referred to as "non-effective recording area." In the first dot recording mode at k=4, a non-effective recording area of 20 raster line spaces is present prior to the effective recording area. In other words, the effective recording area starts at the $21^{st}$ raster line from the upper end of a nozzle scanning area (that is, the total area including both the effective recording area and the non-effective recording area). The position of the nozzles in the first pass of main scan is set at a predetermined distance from the upper end of the printing paper. The earlier and upper starting of the effective recording area thus enables recording of dots to begin at the position closer to the upper end of the printing paper.

FIG. 6A shows the scanning parameters in the first dot recording mode at k=4. The table of FIG. 6A shows the sub-scan feed amount L, the summation thereof ΣL, and the offset F of the nozzles after each pass of sub-scan.

FIG. 6B shows effective raster line numbers allocated to effective raster lines recorded with the respective nozzles in the main scan after each pass of sub-scan in the first dot recording mode at k=4. The left end column in the table of FIG. 6B shows the nozzles numbers #0 through #7. The numbers in the other columns represent which raster lines in the effective recording area are recorded with these nozzles #0 through #7 after the $0^{th}$ pass to the $7^{th}$ pass of sub-scan. For example, in the main scan after the $0^{th}$ pass of sub-scan (that is, the first pass of main scan to record the effective recording area), the nozzles #5 through #7 respectively record the $1^{st}$, $5^{th}$, and $9^{th}$ effective raster lines. In the main scan after the $1^{st}$ pass of sub-scan, the nozzles #3 through #7 respectively record the $3^{rd}$, $7^{th}$, $11^{th}$, $15^{th}$, and $19^{th}$ effective raster lines. Here the effective raster lines represent raster lines in the effective recording area.

In the example of FIG. 6B, the effective raster lines recorded in one identical pass of main scan are present at intervals of the nozzle pitch k (=4). One cycle of the main scan accordingly records N×k (=32 in this example) raster lines. The nozzles are arranged at the intervals of the nozzle pitch k, so that the 32 raster lines recorded in one cycle are not consecutive as clearly understood from FIG. 5. The table of FIG. 6B shows which nozzles are used to record the first 32 raster lines in the effective recording area.

In the table of FIG. 6B, the effective raster line numbers expressed by the bracketed numerals show that raster lines at the equivalent positions to those of the bracketed raster lines under the current scanning conditions have been recorded in a previous cycle. The value obtained by subtracting 32 from the bracketed numeral represents the effective raster line number allocated to the equivalent raster line. For example, the effective raster line No. 36 recorded with the nozzle #0 is the raster line at the equivalent position to that of the effective raster line No. 4 under the current scanning conditions.

FIG. 7 shows the nozzle numbers allocated to the nozzles used for recording the effective raster lines in the first dot recording mode at k=4. The numerals 1 through 31 in the left end column of FIG. 7 represent the effective raster line numbers. The right side columns show the effective raster lines recorded with the 8 working nozzles #0 through #7 in the main scan after the respective sub-scan feeds. For example, in the main scan after $0^{th}$ pass of sub-scan, the nozzles #5 through #7 respectively record the $1^{st}$, $5^{th}$, and $9^{th}$ effective raster lines. The comparison between FIG. 7 and FIG. 6B clearly shows the relationship between the effective raster line number and the nozzle number.

The four different symbols •, ×, ↑, ↓ appearing in the second left column of @ in FIG. 7 show whether or not adjoining raster lines have already been recorded at the time when each raster line of interest is recorded. These symbols have the following meanings:

↓: Only the adjoining raster line after the raster line of interest has already been recorded;

↑: Only the adjoining raster line before the raster line of interest has already been recorded;

×: Both the adjoining raster lines before and after the raster line of interest have already been recorded; and

•: Neither of the adjoining raster lines before and after the raster line of interest have not yet been recorded.

The presence or the absence of the record of the adjoining raster lines before and after each raster line of interest affects the picture quality of the raster line of interest that is currently recorded. The picture quality is affected by the drying degree of ink on the adjoining recorded raster lines and by the errors of sub-scan feed. The appearance of the pattern @ defined by the above four symbols at a relatively large period on the printing paper may deteriorate the picture quality of the resulting printed image. In the first dot recording mode shown in FIG. 7, the pattern @ defined by the four symbols does not show any clear periodicity. It is accordingly expected that the resulting recorded image is not subject to significant deterioration of the picture quality due to the periodic pattern but has relatively good picture quality.

The value Δ in the third left column of FIG. 7 shows the maximum number of sub-scan feeds between recording of an adjoining raster line and recording of each raster line of interest. This value Δ is hereinafter called "the differential number of sub-scans." For example, the $2^{nd}$ effective raster line is recorded with the nozzle #1 after the $2^{nd}$ pass of sub-scan, whereas the $1^{st}$ effective raster line is recorded with the nozzle #5 after the $0^{th}$ pass of sub-scan. Namely the $2^{nd}$ raster line has the differential number of sub-scan feeds Δ=2. In a similar manner, there are 3 sub-scan feeds between recording of the $5^{th}$ effective raster line and recording of the $4^{th}$ effective raster line. The $4^{th}$ effective raster line accordingly has the differential number of sub-scan feeds Δ=3.

One cycle includes k (=4) sub-scan feeds. The differential number of sub-scan feeds Δ thus ranges from 0 to k. In the first dot recording mode at k=4, the maximum differential number of sub-scan feeds Δ is equal to 3. This is smaller than the upper limit k (=4).

It is ideal that the actual sub-scan feed amount is an exact integral multiples of the dot pitch. In the actual state, however, there are some feeding errors. The errors of sub-scan feed are accumulated on each pass of sub-scan. In the case where many sub-scan feeds are interposed between two passes of main scan for recording two adjoining raster lines, there may be a displacement of raster lines due to the accumulated errors of sub-scan feed between the two adjoining raster lines. As described above, the differential number of sub-scan feeds Δ shown in FIG. 7 represents the number of sub-scan feeds between recording of an adjoining raster line and recording of each raster line of interest. The smaller differential number of sub-scan feeds Δ is preferable to reduce the displacement of adjoining raster lines due to the accumulated errors of sub-scan feed. In the first dot recording mode at k=4 shown in FIG. 7, the differential number of sub-scan feeds Δ is not greater than 3, which is smaller than the upper limit 4. This characteristic also ensures the favorable picture quality of the resulting image recorded by the first dot recording mode at k=4.

FIG. 8 shows scanning parameters in a second dot recording mode at k=4 and effective raster line numbers allocated to effective raster lines recorded with the respective nozzles. This corresponds to FIG. 5 in the first dot recording mode at k=4. The second dot recording mode and the first dot recording mode at k=4 have the same nozzle pitch k and the same number of effective nozzles Neff and thus enable an image to be recorded at a same resolution [dpi] and a same recording speed. The difference between the first dot recording mode and the second dot recording mode at k=4 is only the sequence of the variation in sub-scan feed amount L. In the first dot recording mode at k=4, the sub-scan feed amount L varies as 10, 7 6, and 9 dot spaces in this order. In the second dot recording mode at k=4, on the other hand, the sub-scan feed amount L varies as 7, 6, 9, and 10 dot spaces in this order.

Like the first dot recording mode at k=4, the second dot recording mode at k=4 has two characteristics. First, the nozzle pitch k and the number of working nozzles N are integers that are not less than 2 and are not prime to each other. Second, a plurality of different values are set to the sub-scan feed amount L.

FIG. 9 shows the nozzle numbers allocated to the nozzles used for recording the effective raster lines in the second dot recording mode at k=4. This corresponds to FIG. 7 in the first dot recording mode at k=4. As in the case of the first dot recording mode at k=4 shown in FIG. 7, in the second dot recording mode at k=4 shown in FIG. 9, the pattern @ defined by the four different symbols, which represent the presence or absence of recorded adjoining raster lines at the time when each raster line of interest is recorded, does not have any clear periodicity. It is accordingly expected that the resulting recorded image have relatively good picture quality. In the second dot recording mode at k=4, the differential number of sub-scan feeds Δ is also not greater than 3. This causes the smaller accumulated errors of sub-scan feed and thus ensures the favorable picture quality of the resulting image recorded by the second dot recording mode at k=4.

As described above, the first dot recording mode and the second dot recording mode at k=4 have the first characteristic that the nozzle pitch k and the number of working nozzles N are integers that are not less than 2 and are not prime to each other, and the second characteristic that a plurality of different values are set to the sub-scan feed amount L. There may be a large number of equivalent dot recording modes having different sequences of the variation in sub-scan feed amount L. In the case where there are a plurality of equivalent dot recording modes having different sequences of the variation in sub-scan feed amount L but identical resolution and recording speed, which of the equivalent dot recording modes attains the highest picture quality depends upon the individual printers. This is because the picture quality of the image recorded by each printer is affected by the combination of errors caused by the manufacture of the printer (for example, the errors of the nozzle pitch and the errors of sub-scan feed) with the adopted scanning method in the dot recording mode (mainly the set of feeding amounts of sub-scan). When there are a plurality of equivalent dot recording modes having different sequences of the variation in sub-scan feed amount like the first and the second dot recording modes discussed above, it is preferable to select the optimum dot recording mode that attains the highest picture quality with regard to each printer.

C. Manufacture of Printer (Method of Setting Displacement Data)

Figure 10:
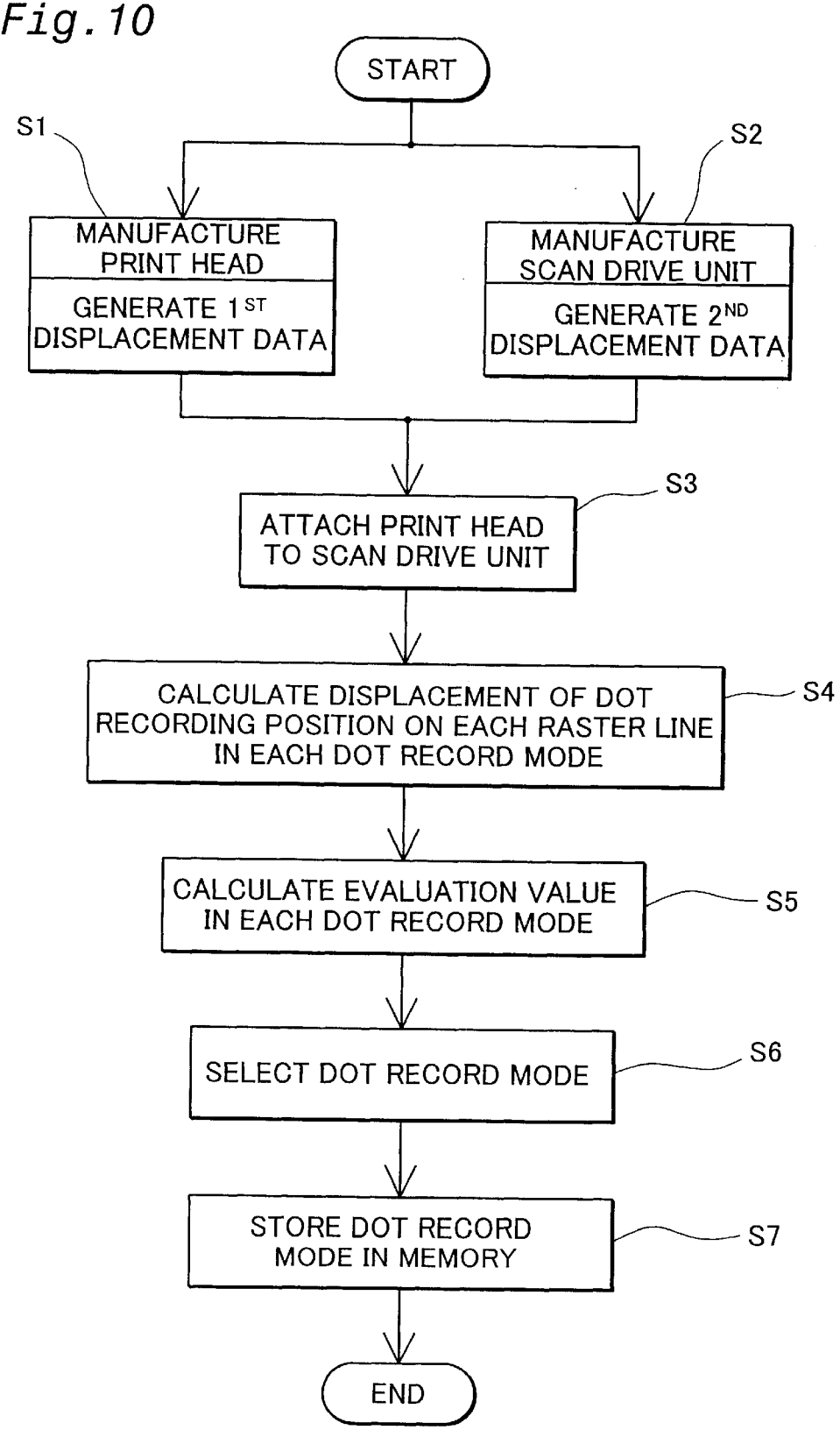
FIG. 10 is a flowchart showing a procedure of manufacturing a printing apparatus.

FIG. 10 is a flowchart showing a procedure of manufacturing the printing apparatus. The procedure first manufactures the print head 28 at step S1 and a scan drive unit at step S2. The scan drive unit is a part of the color printer 22 including the main scan drive unit 210 and the sub-scan drive unit 212. As mentioned previously, the main scan drive unit 210 is actualized by the feeding mechanism of the carriage 31 including the carriage motor 24, and the sub-scan drive unit 212 is actualized by the feeding mechanism of the printing paper P including the sheet feed motor 23 (see FIG. 2). The procedure of step S1 generates first displacement data in the course of manufacturing the print head 28. The first displacement data substantially represents deviations of the dot recording positions in the sub-scanning direction by the other nozzles from the dot recording position by a reference nozzle #7 (hereinafter may be referred to as the vertical displacement). The procedure of step S2 generates second displacement data, which substantially represents errors of sub-scan feed in the sub-scanning direction, in the course of manufacturing the scan drive unit. The processes of generating the first and second displacement data will be discussed in detail later.

The procedure attaches the print head 28 to the scan drive unit at step S3, and calculates a displacement of dot recording position on each raster line in each dot record mode at step S4. The procedure then calculates an evaluation value of each dot record mode from the calculated displacement on the raster line at step S5, and selects the optimum dot record mode based on the calculated evaluation value at step S6. The procedure subsequently stores the selected dot record mode into the mode selection memory 220 included in the PROM 42 (see FIGS. 2 and 4) at step S7. In the example of FIG. 4, only the "720 dpi, Fine" mode has a plurality of dot record modes as selectable options. When there are a plurality of mode classes, each having a plurality of dot record modes as selectable options, the procedures of steps S4 through S7 are repeatedly executed to select one optimum dot record mode with regard to each mode class. The information representing the selected dot record modes is collectively stored as the print mode selection information in the mode selection memory 220. The procedures of the respective steps are discussed in detail below.

Figure 11:
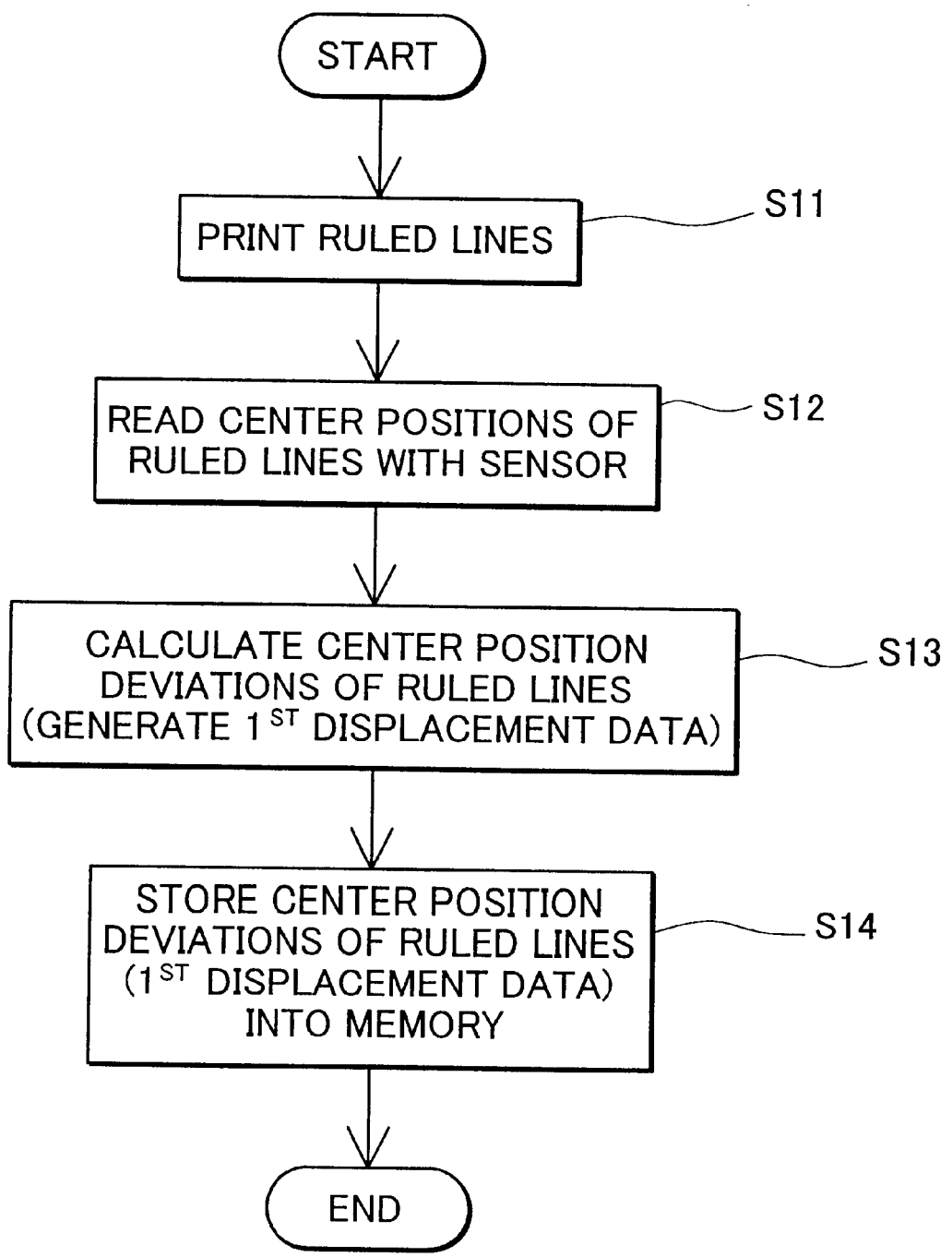
FIG. 11 is a flowchart showing the details of the process of generating first displacement data at step S1 in the flowchart of FIG. 10.

FIG. 11 is a flowchart showing the details of the process of generating the first displacement data at step S1 in the flowchart of FIG. 10. The procedure of step S1 attaches the manufactured print head 28 to a predetermined test scan drive unit (not shown). When the program enters the routine of FIG. 11, a head-induced displacement detection pattern recording unit 324 (see FIG. 12) first causes the print head 28 to eject ink droplets while being fed in the direction of the main scan, so as to print ruled lines in the feeding direction at step S11. The ruled lines recorded here form a head-induced displacement detection pattern.

Figure 12:
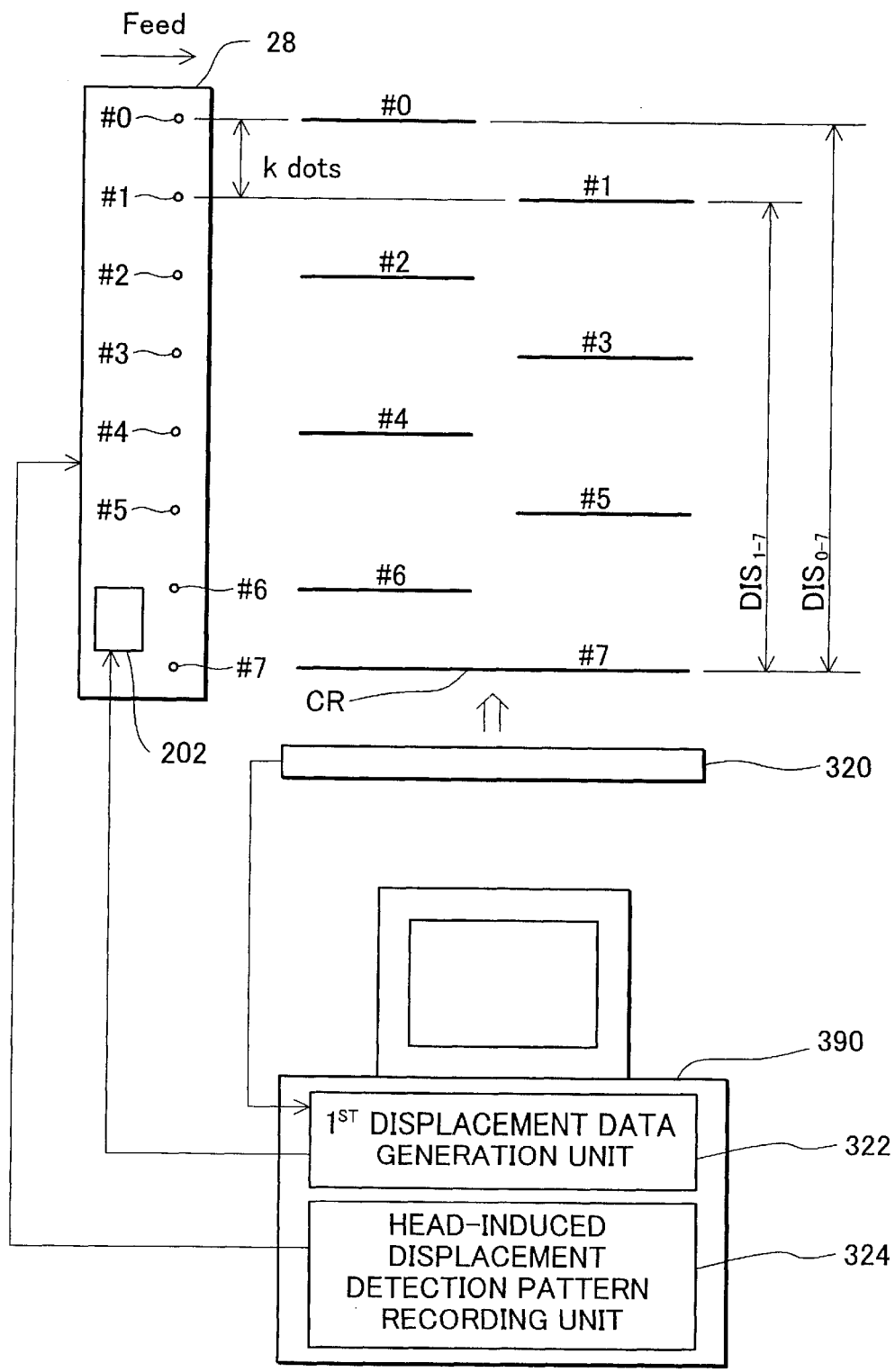
FIG. 12 shows an example of head-induced displacement detection pattern recorded at step S11 in the flowchart of FIG. 11 and a process of reading the head-induced displacement detection pattern.

FIG. 12 shows an example of the head-induced displacement detection pattern recorded at step S11 and a process of reading the head-induced displacement detection pattern. The print head 28 attached to the scan drive unit included in the printing apparatus is fed in the direction perpendicular to the alignment of the nozzle array (see FIG. 3) in the respective passes of main scan. The print head 28 is fed in the direction identical with the main scanning direction, that is, the direction perpendicular to the alignment of the nozzle array, in the process of recording the head-induced displacement detection pattern. The head-induced displacement detection pattern recording unit 324, which controls the print head 28 to record the ruled lines, is actualized by execution of a predetermined computer program by a computer 390, which is part of the equipment for manufacturing printers.

The upper portion of FIG. 12 shows an example of horizontal ruled lines recorded with all the nozzles included in one nozzle array for one color ink. The numeral with the symbol # above each ruled line represents the nozzle used to record the ruled line. In this example, it is assumed that the nozzle array includes 8 nozzles #0 through #7. The nozzles of even ordinal numbers record ruled lines on the left half of the printing paper, whereas the nozzles of odd ordinal numbers record ruled lines on the right half of the printing paper. If the ruled lines are recorded with adjoining nozzles in an identical horizontal range on the printing paper, the adjoining ruled lines are close to each other and are not readily distinguishable from each other. The horizontal range in which the respective ruled lines are recorded may be divided into three sections, instead of the two sections. The ruled line on the lower most end (the ruled line recorded with the nozzle #7) is a common ruled line CR. The common ruled line CR is used as the reference line for evaluation of the displacement of the other ruled lines. The nozzle recording this common ruled line CR is the reference nozzle. These ruled lines are recorded simultaneously by one pass in the main scanning direction. The interval between the adjoining ruled lines is thus equal to the nozzle pitch k [dots] on the design. The lower portion of FIG. 12 shows an image sensor 320, a first displacement data generation unit 322, and the head-induced displacement detection pattern recording unit 324, which are used for the series of processing shown in the flowchart of FIG. 11. The first displacement data generation unit 322 is actualized by execution of a predetermined computer program by the computer 390.

Referring back to the flowchart of FIG. 11, the procedure actuates the image sensor 320 (see FIG. 12) to read the center positions of the respective ruled lines at step S12. A linear image sensor of CCDs or a two-dimensional image sensor may be applied for the image sensor 320.

In accordance with a concrete procedure of step S12, the first displacement data generation unit 322 causes each ruled line read by the image sensor 320 to be subjected to the core line process to determine the center position of the ruled line. The center position of each ruled line is measured as a distance DIS from the common ruled line CR. In the example of FIG. 12, the center positions of the ruled lines recorded with the nozzles #0 and #1 are respectively obtained as distances $DIS_{0-7}$ and $DIS_{1-7}$ from the common ruled line CR.

At step S13 in the flowchart of FIG. 11, the first displacement data generation unit 322 calculates deviations of the center positions DH on the respective ruled lines recorded with the corresponding nozzles. Each of center position deviations $DH_0$ to $DH_6$ on the respective ruled lines represents the difference between the center position DIS measured by the image sensor 320 and a designed center position. For example, the interval between the nozzles #6 and #7 is equal to the nozzle pitch k [dots] on the design. The designed center position on the ruled line recorded with the nozzle #6 is thus equal to k [dots], whereas the observed center position is $DIS_{6-7}$. The center position deviation $DH_6$ with regard to the nozzle #6 is obtained by the equation given below:

$$DH_6 = DIS_{6-7} - k \cdot w$$

where w denotes the dot pitch [inch].

The center position deviation $DH_5$ with regard to the nozzle #5 is the difference between the observed center position $DIS_{5-7}$ and $2 \cdot k$ [dots]. The center position deviation $DH_4$ with regard to the nozzle #4 is the difference between the observed center position $DIS_{4-7}$ and $3 \cdot k$ [dots]. The center position deviations with regard to the other nozzles are defined in the same manner. In general, the center position deviation $DH_n$ on the ruled line recorded with the nozzle #n (n=0 to 6) is written as Equation (1) given below:

$$DH_n = DIS_{n-N} - (N-n) \cdot k \cdot w \tag{1}$$

where N denotes the number of nozzles included in each nozzle array.

Each of the center position deviations $DH_0$ to $DH_6$ has a positive value when the ruled line is farther from the common ruled line CR than the designed value, while having a negative value when the ruled line is closer to the common ruled lines CR than the designed value. The nozzle #7 is the reference nozzle, so that the center position deviation is not defined with regard to the nozzle #7.

The center position deviations $DH_0$ to $DH_6$ are regarded as the deviations of dot recording position intrinsic to the respective nozzles #0 through #6. At step S14 in the flowchart of FIG. 11, the first displacement data generation unit 322 stores the center position deviations $DH_0$ to $DH_6$ intrinsic to the respective nozzles #0 through #6 as the first displacement data into a head ID memory 202, which is provided on the print head 28. The head ID memory 202 corresponds to the first storage unit of the present invention.

Figure 13:
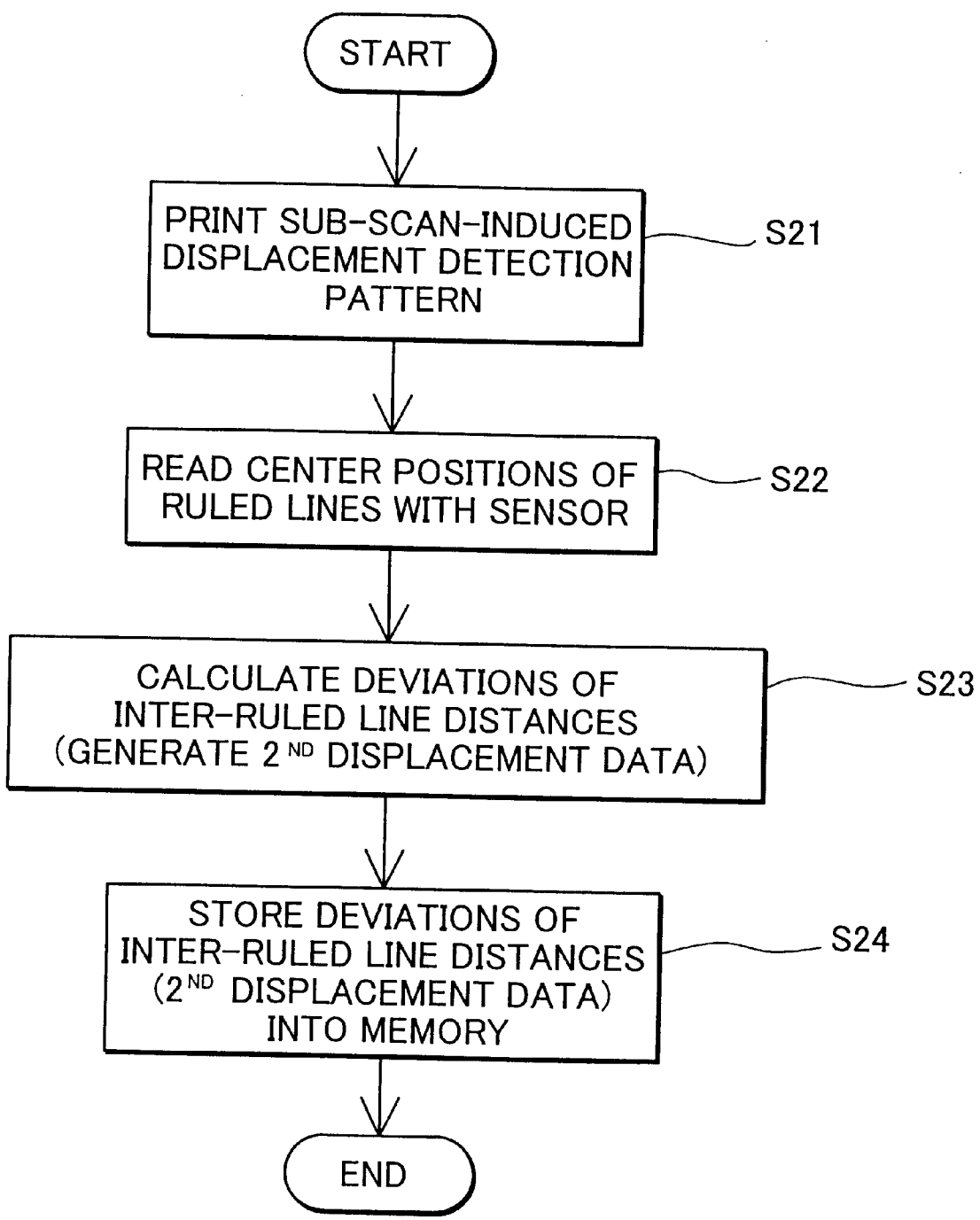
FIG. 13 is a flowchart showing the details of the process of generating second displacement data at step S2 in the flowchart of FIG. 10.

FIG. 13 is a flowchart showing the details of the process of generating the second displacement data at step S2 in the flowchart of FIG. 10. The procedure of step S2 attaches a predetermined test head 426 (see FIG. 14) to the manufactured scan drive unit. The test head 426 has only one nozzle, from which ink is ejected. When the program enters the routine of FIG. 13, a sub-scan-induced displacement detection pattern recording unit 424 (see FIG. 14) causes a sub-scan-induced displacement detection pattern to be printed on a sheet of printing paper set on the scan drive unit at step S21. In accordance with a concrete procedure of step S21, the sub-scan-induced displacement detection pattern recording unit 424 causes the scan drive unit to carry out the main scan and the sub-scan in each dot record mode, while causing one nozzle on the test head 426 to eject ink and print ruled lines (the sub-scan-induced displacement detection pattern). The sub-scan-induced displacement detection pattern recording unit 424 is actualized by execution of a predetermined computer program by a computer 490 (see FIG. 14), which is part of the equipment for manufacturing printers.

Figure 14:
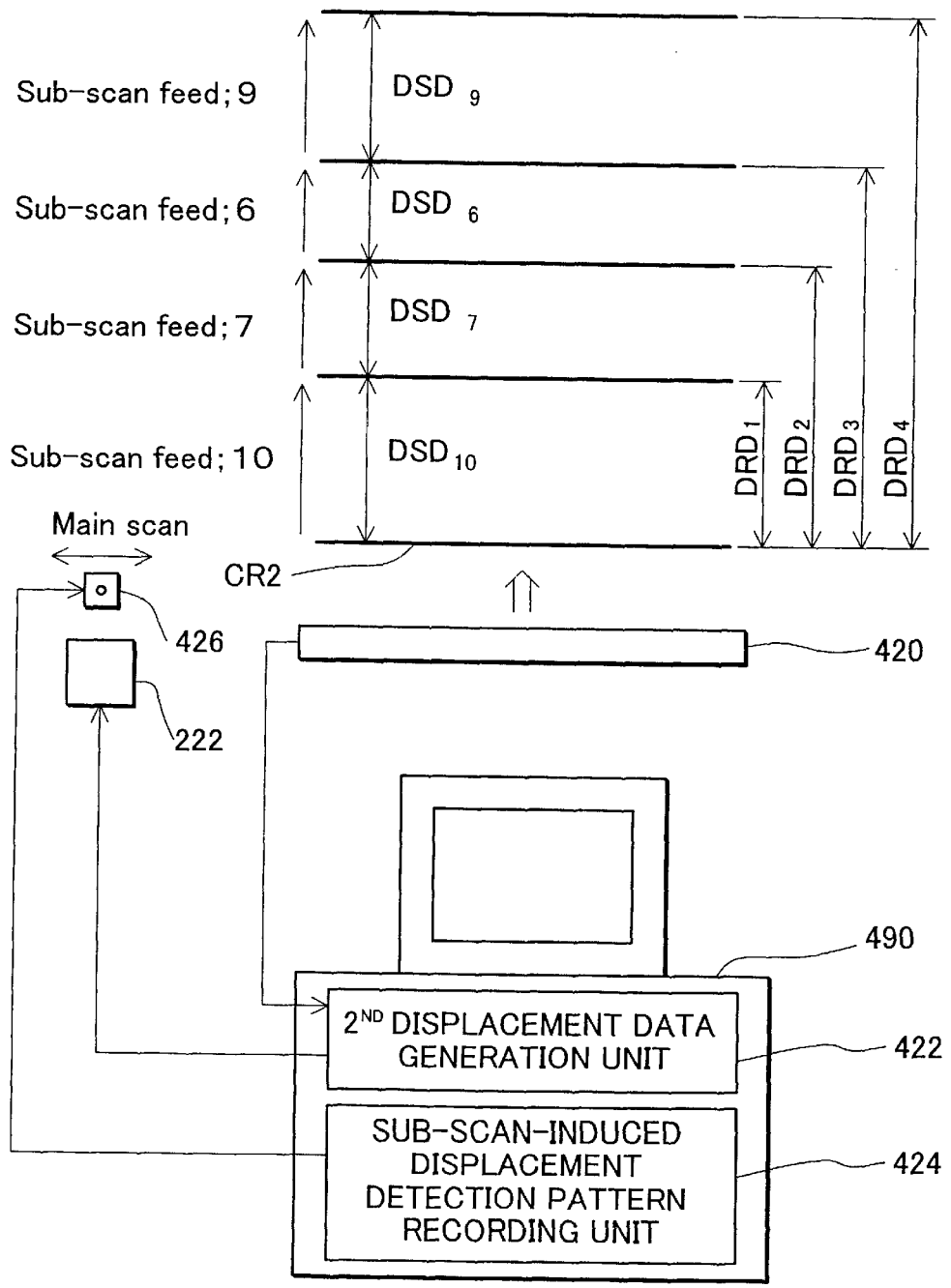
FIG. 14 shows an example of sub-scan-induced displacement detection pattern recorded at step S21 and a process of reading the sub-scan-induced displacement detection pattern.

FIG. 14 shows an example of the sub-scan-induced displacement detection pattern recorded at step S21 and a process of reading the sub-scan-induced displacement detection pattern. In the example of FIG. 14, the sub-scan-induced displacement detection pattern including 5 ruled lines is recorded by the combined functions of the test head 426 and the sub-scan-induced displacement detection pattern recording unit 424. The sub-scan-induced displacement detection pattern recording unit 424 carries out the sub-scan by one cycle of the feeding amounts of sub-scan set in each dot record mode, while printing the sub-scan-induced displacement detection pattern in the main scan. In the first dot recording mode shown in FIG. 5, for example, the ruled lines are printed in the main scan, while the sub-scan is carried out between each adjoining passes of the main scan with a variation in feeding amount as 10 dots, 7 dots, 6 dots, and 9 dots. This gives the total of five ruled lines including a ruled line recorded prior to the sub-scan. This ruled line recorded prior to the sub-scan is hereinafter referred to as a reference ruled line CR2. These five ruled lines form the sub-scan-induced displacement detection pattern.

The lower portion of FIG. 14 shows a linear image sensor 420 and a second displacement data generation unit 422, which are also used for the series of processing in the flowchart of FIG. 13. The second displacement data generation unit 422 is actualized by execution of a predetermined computer program by the computer 490, which is part of the equipment for manufacturing printers. A linear image sensor of CCDs or a two-dimensional image sensor may be applied for the image sensor 420. The procedure actuates the image sensor 420 to read the center positions of the respective ruled lines at step S22 in the flowchart of FIG. 13. The procedure of reading the center positions of the respective ruled lines at step S22 is identical with the procedure of step S12 in the flowchart of FIG. 11. The center position of each ruled line is observed as a distance DRD from the reference ruled line CR2 printed prior to the sub-scan. In the example of FIG. 14, the center positions of the respective ruled lines are sequentially obtained as $DRD_1$ to $DRD_4$.

At step S23 in the flowchart of FIG. 13, the second displacement data generation unit 422 calculates inter-ruled line distances DSD from the observed center positions DRD of the respective ruled lines (that is, the distances from the reference ruled lines CR2) and deviations DSS of the inter-ruled line distances. The inter-ruled line distance represents the distance between two adjoining ruled lines among the ruled lines printed at step S21. The procedure of step S21 carries out the sub-scan by a predetermined feeding amount or distance between recording of one ruled line and recording of a next ruled line. The inter-ruled line distance DSD accordingly corresponds to each feeding distance of sub-scan between the adjoining ruled lines. In the example of FIG. 14, an inter-ruled line distance $DSD_{10}$ between the reference ruled line CR2 and the second ruled line is obtained by the equation given below. Here the feeding amount of sub-scan is equal to 10 [dots] between printing of the reference ruled line CR2 and printing of the second ruled line, so that the inter-ruled line distance between the reference ruled line CR2 and the second ruled line is expressed as $DSD_{10}$.

$$DSD_{10}=DRD_1$$

In the example of FIG. 14, an inter-ruled line distance $DSD_7$ between the second ruled line and the third ruled line recorded via the sub-scan feed of 7 dots is obtained by the equation given below:

$$DSD_7=DRD_2-DRD_1$$

Other inter-ruled line distances $DSD_6$ and $DSD_9$ are obtained in a similar manner as:

$$DSD_6=DRD_3-DRD_2$$

$$DSD_9=DRD_4-DRD_3$$

Deviations $DSS_{10}$, $DSS_7$, $DSS_6$, and $DSS_9$ of the inter-ruled line distances respectively represent the differences between the inter-ruled line distances $DSD_{10}$, $DSD_7$, $DSD_6$, and $DSD_9$, which are calculated from the center positions $DRD_1$ through $DRD_4$ of the respective ruled lines measured by the image sensor 420, and designed feeding amounts of sub-scan. For example, the sub-scan feed of 10 dots is carried out between printing of the reference ruled line CR2 and printing of the second ruled line, so that the designed inter-ruled line distance is equal to 10 [dots]. The deviation $DSS_{10}$ of the inter-ruled line distance under the sub-scan feed of 10 dots is difference between the calculated inter-ruled line distance $DSD_{10}$ and the designed feeding amount 10 [dots]. The deviation $DSS_{10}$ is expressed by the equation given below:

$$DSS_{10}=DSD_{10}-10\cdot w$$

where w denotes the dot pitch [inch].

The other deviations $DSS_7$, $DSS_6$, and $DSS_9$ of the inter-ruled line distances are obtained in a similar manner as:

$$DSS_7=DSD_7-7\cdot w$$

$$DSS_6=DSD_6-6\cdot w$$

$$DSS_9=DSD_9-9\cdot w$$

The deviations $DSS_{10}$, $DSS_7$, $DSS_6$, and $DSS_9$ of the inter-ruled line distances respectively correspond to the errors of sub-scan feed by the feeding amounts of 10 dots, 7 dots, 6 dots, and 9 dots. Each of the deviations $DSS_{10}$, $DSS_7$, $DSS_6$, and $DSS_9$ of the inter-ruled line distances has a positive value when the actual feeding amount of sub-scan is greater than the designed feeding amount, while having a negative value when the actual feeding amount of sub-scan is smaller than the designed feeding amount.

At step S23 in the flowchart of FIG. 13, the second displacement data generation unit 422 calculates the inter-ruled line distances DSD from the observed center positions DRD of the respective ruled lines (that is, the distances from the reference ruled line CR2) and subsequently determines the errors of sub-scan feed DSS. The second displacement data generation unit 422 subsequently stores the calculated errors of sub-scan feed $DSS_{10}$, $DSS_7$, $DSS_6$, and $DSS_9$ as the second displacement data in a sub-scan displacement memory 222 included in the PROM 42 at step S24. The sub-scan displacement memory 222 corresponds to the second storage unit of the present invention.

Referring back to the flowchart of FIG. 10, the print head 28 with the first displacement data stored in the head ID memory 202 is attached to the scan drive unit with the second displacement data stored in the sub-scan displacement memory 222.

In the actual printing operations, the dot record mode unequivocally determines how each raster line is recorded on the printing paper, that is, which nozzle is used to record the raster line and what settings of the sub-scan feed are applied prior to recording the raster line. In other words, the nozzle used and the settings of the sub-scan feed to record each raster line on the printing paper are varied according to the selected dot record mode. For example, in the first dot recording mode shown in FIGS. 6 and 7, the $10^{th}$ raster line is recorded with the nozzle #3 after two sub-scan feeds by the feeding amounts of 10 dots and 7 dots. In the second dot recording mode shown in FIGS. 8 and 9, on the other hand, the $10^{th}$ raster line is recorded with the nozzle #7 prior to any pass of the sub-scan. The displacement of dot recording position in the sub-scanning direction on each raster line is the sum of the accumulated errors of sub-scan feed and the deviation of the dot recording position intrinsic to each nozzle (the vertical displacement). The displacements of dot recording position on the respective raster lines are thus calculated from the first displacement data (that is, the deviations of dot recording position intrinsic to the respective nozzles) $DH_0$ through $DH_6$ and the second displacement data (that is, the errors of sub-scan feed) $DSS_{10}$, $DSS_7$, $DSS_6$, and $DSS_9$.

For example, in the first dot recording mode shown in FIG. 7, the $10^{th}$ raster line is recorded with the nozzle #3 after the first pass of sub-scan by 10 dots and the second pass of sub-scan by 7 dots. The displacement of dot recording position $D_{1,10}$ on the $10^{th}$ raster line in the first recording process is expressed by the equation given below. In distinction from the errors of the respective sub-scan feeds in the second dot recording mode, the errors of the respective sub-scan feeds by 10, 7, 6, and 9 dots in the first dot recording mode are expressed as $DSS_{1,10}$, $DSS_{1,7}$, $DSS_{1,6}$ and $DSS_{1,9}$.

$$D_{1,10}=(DSS_{1,10}+DSS_{1,7})-DH_3$$

In the first dot recording mode, the $20^{th}$ raster line is recorded with the nozzle #4 after the first pass of sub-scan by 10 dots, the second pass of sub-scan by 7 dots, and the third pass of sub-scan by 6 dots. The displacement of dot recording position $D_{1,20}$ on the $20^{th}$ raster line in the first recording process is accordingly expressed by the equation given below:

$$D_{1,20}=(DSS_{1,10}+DSS_{1,7}+DSS_{1,6})-DH_4$$

In general, when the p-$^{th}$ raster line in the first dot record mode is recorded with the r-$^{th}$ nozzle, the displacement of dot recording position $D_{1,p}$ in the sub-scanning direction on the p-$^{th}$ raster line is expressed by the equation given below:

$$D_{1,p}=\Sigma_{1,p}(DSS)-DH_r$$

Here the first term on the right side $\Sigma_{1,p}(DSS)$ represents the summation of the errors of the respective sub-scan feeds DSS in the first dot record mode before the p-$^{th}$ raster line is recorded. The second term on the right side $DH_r$ represents the deviation of the dot recording position by the r-$^{th}$ nozzle, which records the p-$^{th}$ raster line, from the dot recording position by the reference nozzle. The dot recording position may be shifted downstream or upstream in the sub-scanning direction. The displacement of dot recording position $D_{1,p}$ has a positive value in the downstream shift, while having a negative value in the upstream shift. The print head 28 is attached to the printer 22 in such a manner that the nozzle #1 is present on the upstream side in the sub-scanning direction and the reference nozzle #7 is present on the downstream side. As discussed previously with regard to step S13 in the flowchart of FIG. 11, $DH_r$ has a positive value when the position of the ruled line recorded with each nozzle is deviated relative to the position of the common ruled line CR recorded with the reference nozzle #7 toward the nozzle #1 (that is, to the upstream side in the sub-scanning direction). In the upper equation, the negative sign is accordingly given to the second term on the right side $DH_r$.

The displacement of dot recording position $D_{i,p}$ on the p-$^{th}$ raster line thus obtained represents the difference from a designed dot recording position relative to the raster line recorded with the reference nozzle #7 prior to any pass of the sub-scan. The $9^{th}$ raster line shown in FIG. 7 is recorded with the reference nozzle #7 prior to any pass of the sub-scan, so that the displacement of dot recording position $D_{1,9}$ on the $9^{th}$ raster line is equal to zero.

The above description with regard to the displacement of dot recording position on the raster line is also applicable to the second dot record mode. In general, when the p-$^{th}$ raster line in the i-$^{th}$ dot record mode is recorded with the r-$^{th}$ nozzle, the displacement of dot recording position $D_{i,p}$ in the sub-scanning direction on the p-$^{th}$ raster line is expressed by Equation (2) given below:

$$D_{i,p}=\Sigma_{i,p}(DSS)-DH_r \qquad (2)$$

Here the first term on the right side $\Sigma_{i,p}(DSS)$ represents the summation of the errors of the respective sub-scan feeds DSS in the i-$^{th}$ dot record mode before the p-$^{th}$ raster line is recorded. The second term on the right side $DH_r$ represents the deviation of the dot recording position by the r-$^{th}$ nozzle, which records the p-$^{th}$ raster line, from the dot recording position by the reference nozzle.

Figure 15:
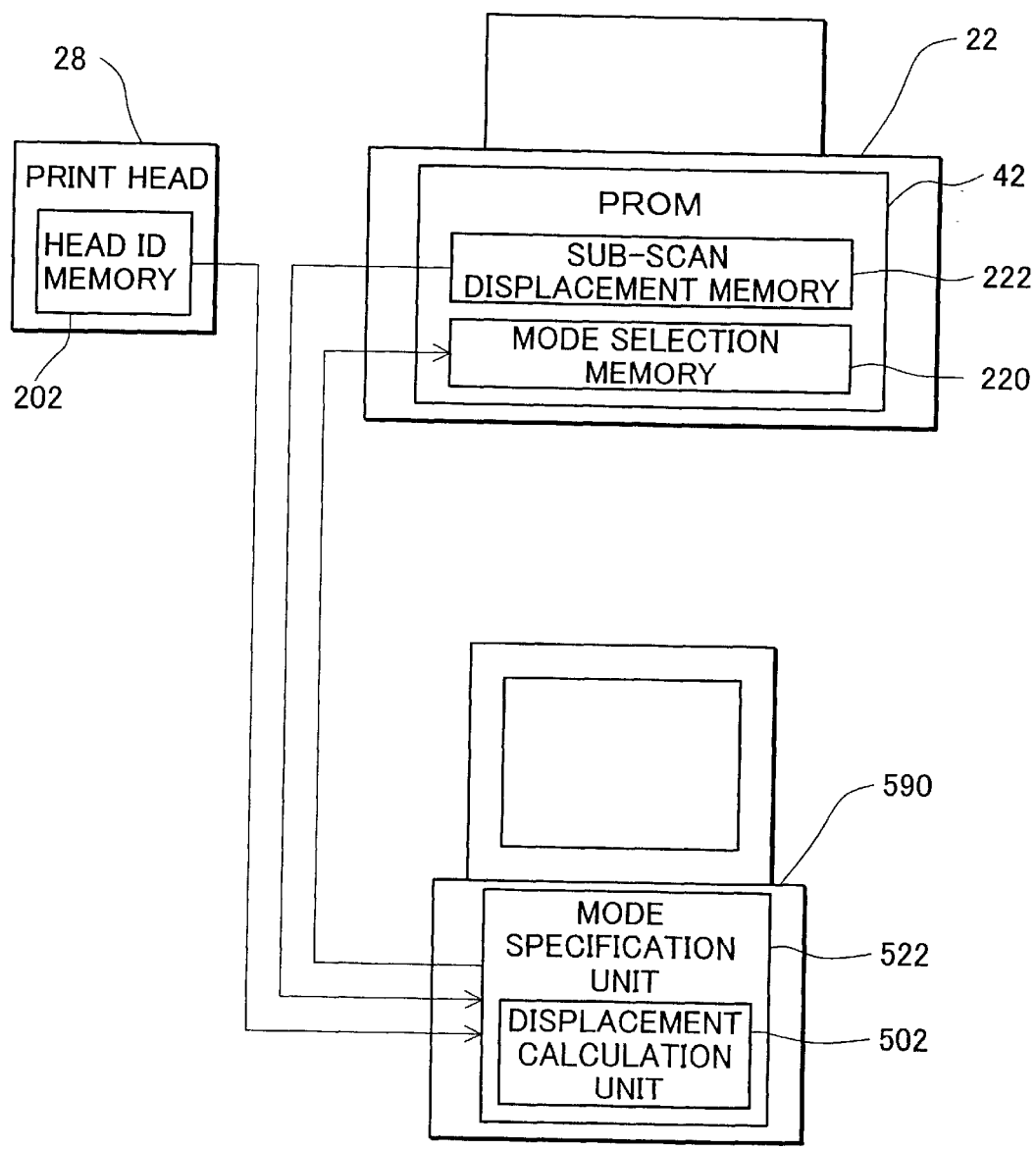
FIG. 15 shows the relations among a displacement calculation unit included in a computer, which is part of the equipment for manufacturing printers, a head ID memory on the print head, and a sub-scan displacement memory included in a scan drive unit.

FIG. 15 shows the relations among a displacement calculation unit 502 included in a computer 590, which is part of the equipment for manufacturing printers, the head ID memory 202 on the print head 28, and the sub-scan displacement memory 222 included in the scan drive unit. Although the print head 28 is incorporated in the printer 22, the print head 28 is separate from the printer 22 in the illustration of FIG. 15 for convenience. Referring back to the flowchart of FIG. 10, at step S4, the displacement calculation unit 502 included in a mode specification unit 522 calculates the displacement of dot recording position $D_{i,p}$ on each raster line according to the above procedures, based on the first displacement data $DH_{i,p}$ stored in the head ID memory 202 and the second displacement data DSS stored in the sub-scan displacement memory 222. The displacement of dot recording position $D_{i,p}$ on each raster line is calculated with regard to each of the dot record modes provided as selectable options. Here the mode specification unit 522 corresponds to the selection unit of the present invention.

At step S5 in the flowchart of FIG. 10, the mode specification unit 522 determines a difference in dot array interval $ID_{i,(p+1)-p}$ between adjoining raster lines in each dot record mode and calculates a variance DDi of the difference in dot array interval $ID_{i,(p+1)-p}$. The variance DDi of the difference in dot array interval $ID_{i,(p+1)-p}$ represents the evaluation value in each dot record mode.

The displacement of dot recording position $D_{i,p}$ on the p-$^{th}$ raster line and the displacement of dot recording position $D_{i,(p+1)}$ on the (p+1)-$^{th}$ raster line are obtained according to Equation (2) given above. The difference in dot array interval $ID_{i,(p+1)-p}$ between the dot array on the p-$^{th}$ raster line and the dot array on the (p+1)-$^{th}$ raster line is expressed by Equation (3) given below. In Equation (3), when the interval between the dot array on the p-$^{th}$ raster line and the dot array on the (p+1)$^{th}$ raster line is greater than a designed value, the difference in dot array interval $ID_{i,(p+1)-p}$ has a positive value. When the interval is less than the designed value, on the other hand, the difference $ID_{i,(p+1)-p}$ has a negative value.

$$ID_{i,(p+1)-p}=D_{i,(p+1)}-D_{i,p} \qquad (3)$$

After calculating the evaluation value DDi in each dot record mode at step S5, the mode specification unit 522 selects the dot record mode having the smallest evaluation value DDi at step S6 in the flowchart of FIG. 10.

Since a smaller variation in dot array interval between each pair of adjoining raster lines is desirable, the procedure selects the dot record mode having the smallest variance DDi of the difference in dot array interval $ID_{i,(p+1)-p}$. When the dot array interval between adjoining raster lines is not constant in the sub-scanning direction but is varied to be greater and less than the designed value, streaks or stripes extending in the main scanning direction may appear in the resulting printed image. Such phenomenon is called "banding". The difference in dot array interval $ID_{i,(p+1)-p}$ between adjoining raster lines in each dot record mode may have a positive value or a negative value corresponding to the greater dot array interval or the smaller dot array interval than the designed value. If each dot record mode is evaluated by the arithmetic mean of the difference in dot array interval $ID_{i,(p+1)-p}$. it is practically impossible to distinguish the dot record mode actually having a small variation in dot array interval from the dot record mode having similar rates of the greater dot array interval and the smaller dot array interval than the designed value, which cancel each other. Selection of the latter dot record mode may cause banding in the resulting printed image. The method of evaluating each dot record mode by the variance DDi of the difference in dot array interval $ID_{i,(p+1)-p}$ between adjoining raster lines, however, does not cause such problems but enables selection of the desired dot record mode that ensures the good picture quality of the printing results.

Referring back to the flowchart of FIG. 10 after selecting the desired dot record mode at step S6, the mode specification unit 522 stores the number allocated to the selected dot record mode into the mode selection memory 220 included in the PROM 42 at step S7. The mode specification unit 522 and the displacement calculation unit 502 are actualized by execution of predetermined computer programs by the computer 590, which is part of the equipment for manufacturing printers.

In the actual printing process, the record mode setting unit 204 in the printer 22 (see FIG. 4) receives information representing the printing resolution and the mode class from the header of print data. The record mode setting unit 204 reads the print mode selection information corresponding to the printing resolution and the mode class from the mode selection memory 220 in the PROM 42, and subsequently reads the dot record mode information corresponding to the print mode selection information from the record mode table 206. The record mode setting unit 204 then gives the parameters defining the main scan and sub-scan operations to the drive unit controller 208 and the raster data storage unit 216. The drive unit controller 208 controls the main scan drive unit 210, the sub-scan drive unit 212, and the print head drive unit 214 to carry out an actual printing operation.

D. Another Method of Setting Displacement Data

The procedure of the above embodiment determines the displacement of dot recording position $D_{i,p}$ on each raster line in each dot record mode, calculates the difference in dot array interval $ID_{i,(p+1)-p}$ between adjoining raster lines, and selects the dot record mode having the smallest variance DDi of the difference in dot array interval $ID_{i,(p+1)-p}$. The desired dot record mode may, however, be selected according to other criterion. The following describes another procedure that calculates the dot array interval between adjoining raster lines from the measured dot recording positions and the feeding amounts of sub-scan and evaluates each dot record mode based on the variance of the calculated dot array interval.

Figure 16:
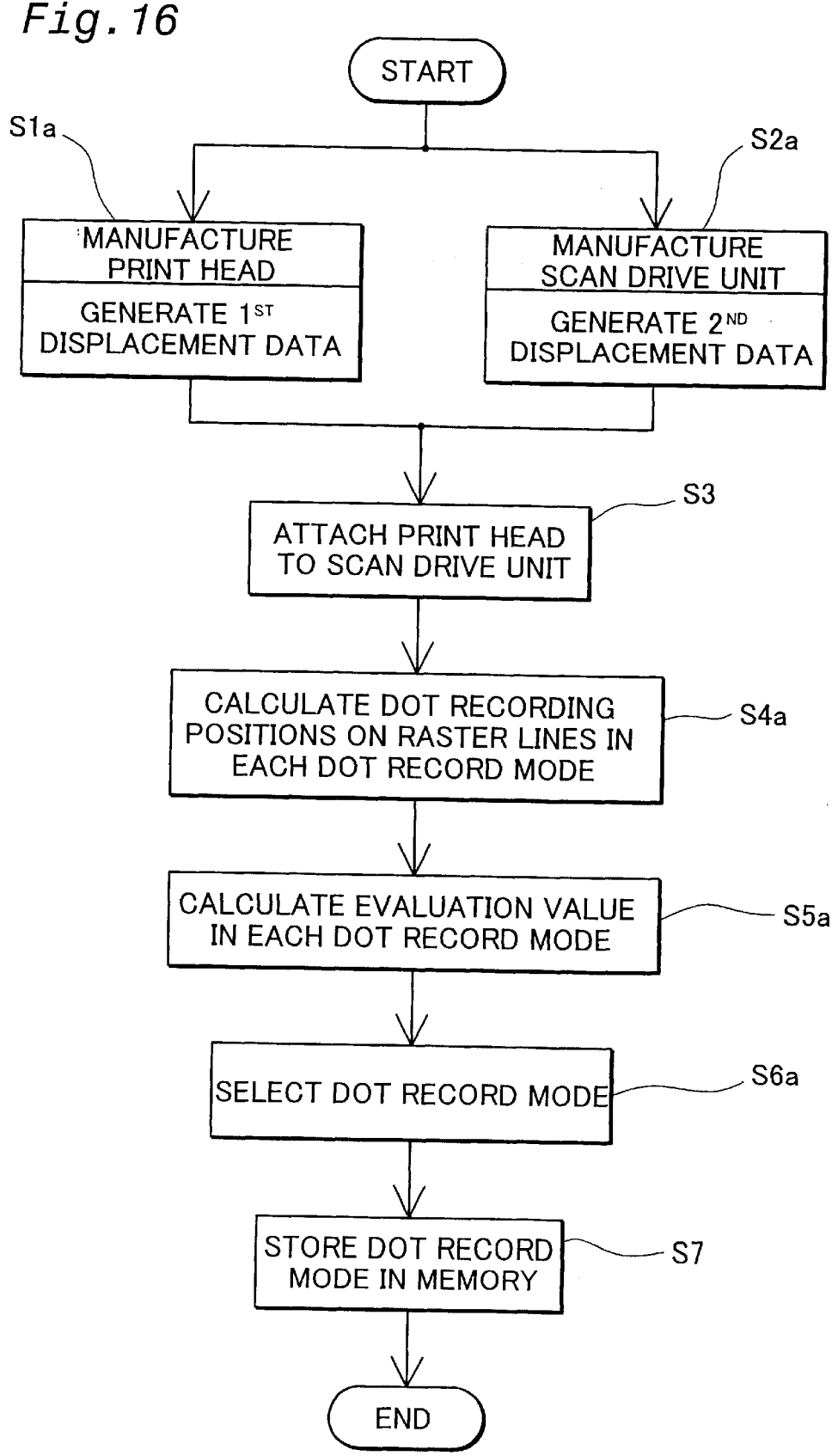
FIG. 16 is a flowchart showing another procedure of manufacturing the printing apparatus.

FIG. 16 is a flowchart showing another procedure of manufacturing the printing apparatus. The procedure of FIG. 16 is similar to the procedure shown in the flowchart of FIG. 10, except that the processes of steps S1a, S2a, S4a, S5a, and S6a are different from those of steps S1, S2, S4, S5, and S6 in FIG. 10. The following mainly describes the different parts from the procedure of FIG. 10.

Figure 17:
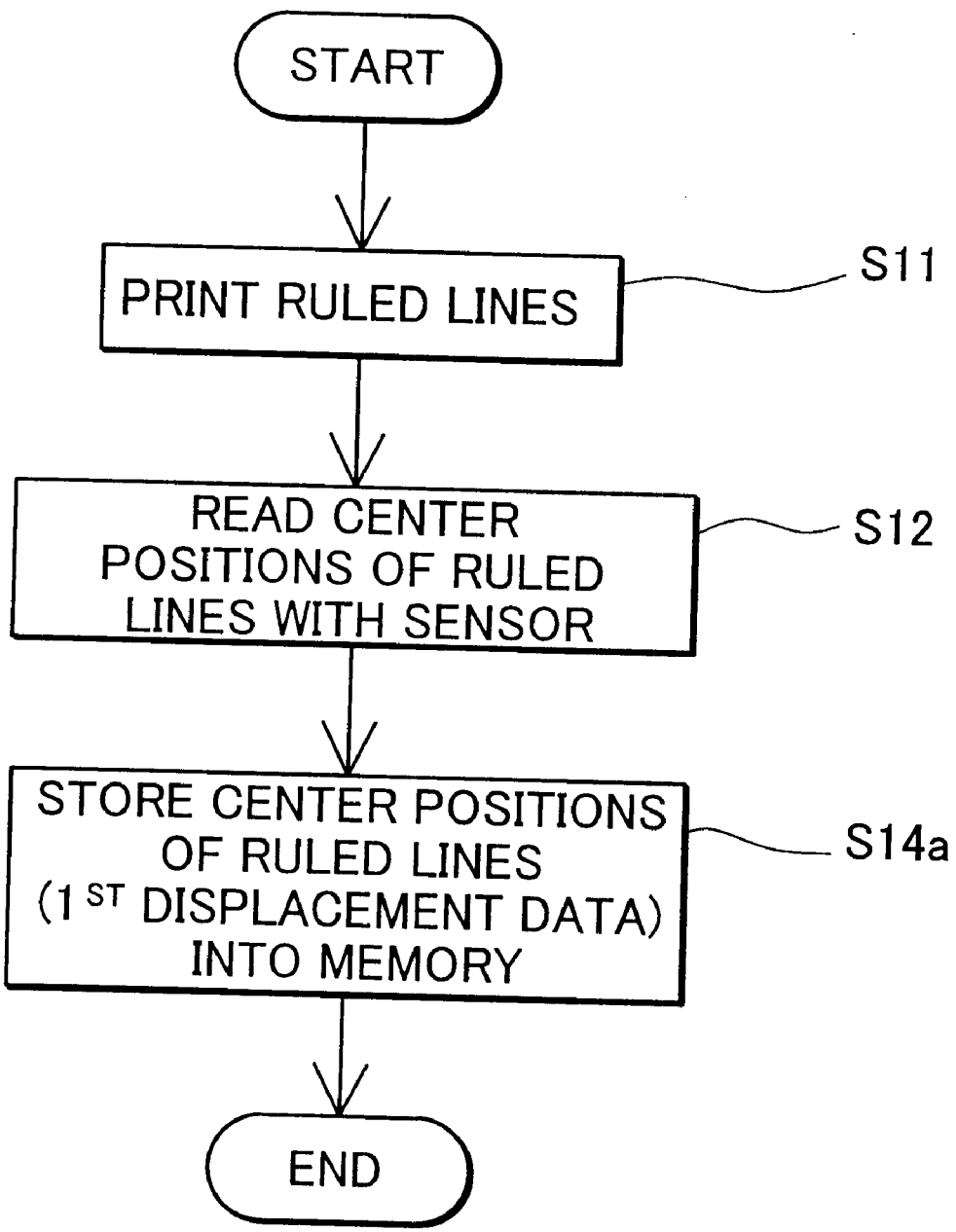
FIG. 17 is a flowchart showing the details of the process of generating the first displacement data at step S1a in the flowchart of FIG. 16.

FIG. 17 is a flowchart showing the details of the process of generating the first displacement data at step S1a in the flowchart of FIG. 16. The procedure of FIG. 17 does not have a step corresponding to step S13 in the flowchart of FIG. 11 and includes step S14a that is different from step S14. Otherwise the process of FIG. 17 is similar to the process of FIG. 11. In the procedure of FIG. 17 that generates the first displacement data, after the center positions $DIS_{0-7}$ to $DIS_{6-7}$ of the respective ruled lines (see FIG. 12) are read at step S12, the first displacement data generation unit 322 stores the obtained center positions $DIS_{0-7}$ to $DIS_{6-7}$ of the respective ruled lines as the first displacement data into the head ID memory 202 at step S14a. The center positions $DIS_{0-7}$ to $DIS_{6-7}$ of the respective ruled lines read at step S12 include the deviations of the dot recording positions intrinsic to the respective nozzles. The first displacement data thus substantially represents the deviations of dot recording position in the sub-scanning direction intrinsic to the respective nozzles.

Figure 18:
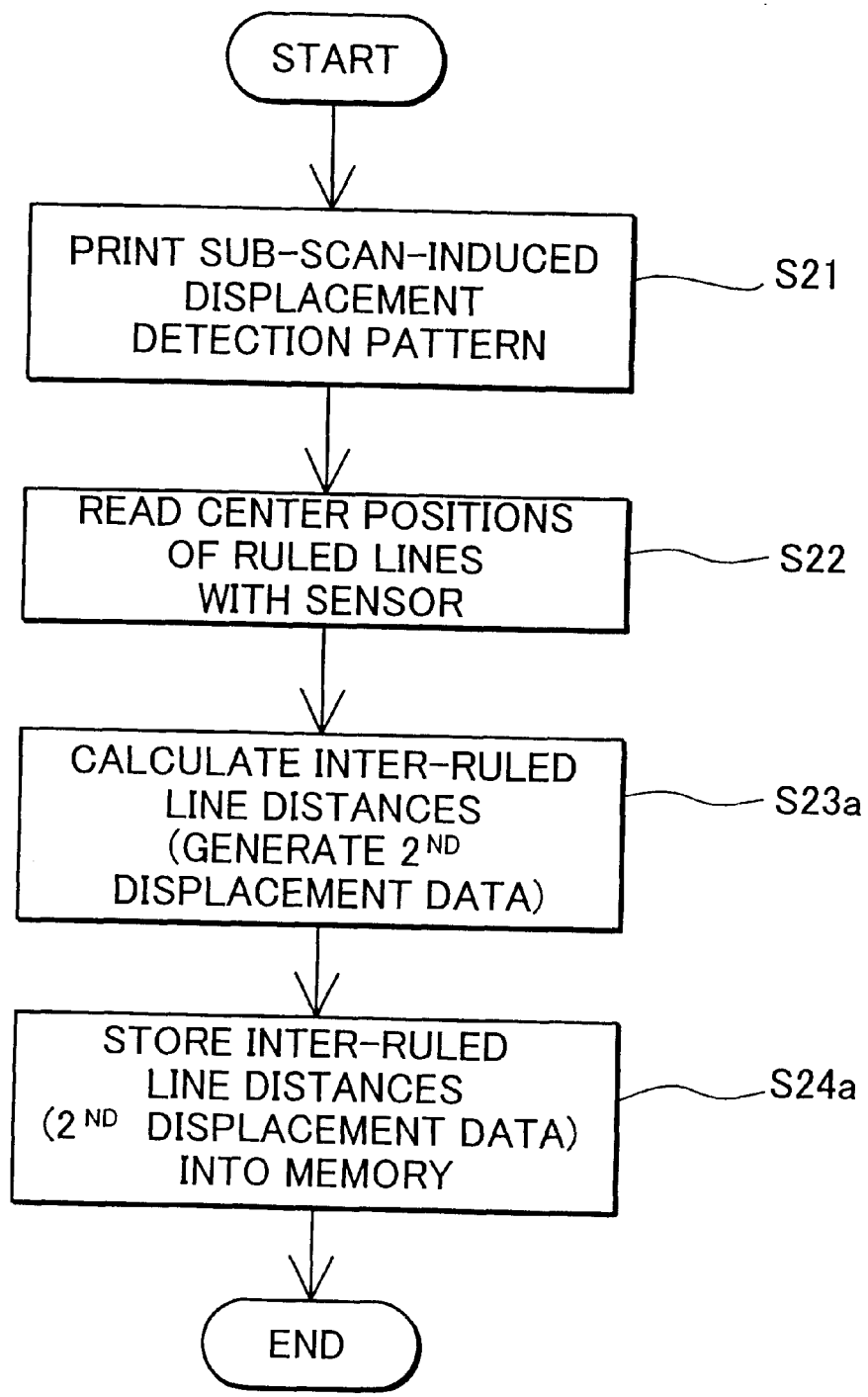
FIG. 18 is a flowchart showing the details of the process of generating the second displacement data at step S2a in the flowchart of FIG. 16.

FIG. 18 is a flowchart showing the details of the process of generating the second displacement data at step S2a in the flowchart of FIG. 16. The process of FIG. 18 is similar to the process shown in the flowchart of FIG. 13, except that steps S23a and S24a are different from steps S23 and S24 in FIG. 13. In the procedure of FIG. 18, after the center positions $DRD_1$ to $DRD_4$ of the respective ruled lines (see FIG. 14) are read at step S22, the second displacement data generation unit 422 calculates the inter-ruled line distances $DSD_{10}$, $DSD_7$, $DSD_6$, and $DSD_9$ from the obtained center positions $DRD_1$ to $DRD_4$ of the respective ruled lines at step S23a. As discussed previously, the inter-ruled line distances $DSD_{10}$, $DSD_7$, $DSD_6$, and $DSD_9$ represent the actual feeding distances of sub-scan. The second displacement data generation unit 422 subsequently stores the calculated inter-ruled line distances (that is, the feeding distances of sub-scan) $DSD_{10}$, $DSD_7$, $DSD_6$, and $DSD_9$ as the second displacement data into the sub-scan displacement memory 222 at step S24a.

As discussed previously with regard to step S21, $DRD_1$ to $DRD_4$ represent the center positions of the respective ruled lines actually recorded with the sub-scan feeds (that is, the distances from the reference ruled line CR2), and thus include errors of sub-scan feed. The inter-ruled line distances (the feeding distances of sub-scan) $DSD_{10}$, $DSD_7$, $DSD_6$, and $DSD_9$ calculated from $DRD_1$ to $DRD_4$ also include the errors of sub-scan feed. The second displacement data thus substantially represents the errors of sub-scan feed.

Referring back to the flowchart of FIG. 16, at step S4a, the displacement calculation unit 502 calculates the recording positions of the dot arrays on the respective raster lines in the sub-scanning direction in each dot record mode, based on the first displacement data $DIS_{0-7}$ to $DIS_{6-7}$ and the second displacement data $DSD_{10}$, $DSD_7$, $DSD_6$, and $DSD_9$. The first displacement data $DIS_{0-7}$ to $DIS_{6-7}$ represent the positions of the dot arrays recorded with the respective nozzles relative to the position of the dot array recorded with the reference nozzle #7. The second displacement data $DSD_{10}$, $DSD_7$, $DSD_6$, and $DSD_9$ represent the feeding amounts of sub-scan. In the example of FIG. 7, the $2^{nd}$ raster line is recorded with the nozzle #1 after the first pass of sub-scan by 10 dots and the second pass of sub-scan by 7 dots, so that the recording position $SSR_{1,2}$ of the dot array on the $2^{nd}$ raster line is expressed by the equation given below:

$$SSR_{1,2}=(DSD_{10}+DSD_7)-DIS_{1-7}$$

In general, when the $p$-$^{th}$ raster line in the first dot record mode is recorded with the $r$-$^{th}$ nozzle, the recording position $SSR_{1,p}$ of the dot array on the $p$-$^{th}$ raster line in the sub-scanning direction is expressed by the equation given below:

$$SSR_{1,p}=\Sigma_{1,p}(DSD)-DIS_{r-N0}$$

Here the first term on the right side $\Sigma_{1,p}(DSD)$ represents the summation of the feeding amounts of sub-scan DSD in the first dot record mode before the $p$-$^{th}$ raster line is recorded. The second term on the right side $DIS_{r-N0}$ represents the center position of the $p$-$^{th}$ raster line recorded with the $r$-$^{th}$ nozzle relative to the center position of a reference raster line recorded with a reference nozzle #N0. The recording position $SSR_{1,p}$ of the dot array on the $p$-$^{th}$ raster line has a positive value in the downstream direction of sub-scan feed. The print head 28 is attached to the printer 22 in such a manner that the nozzle #1 is present on the upstream side in the sub-scanning direction and the reference nozzle #7 is present on the downstream side. As discussed previously with regard to FIG. 12, $DIS_{r-N0}$ represents a distance between the ruled line recorded with each nozzle and the common ruled line CR. Namely $DIS_{r-N0}$ shows the observed center position of each ruled line recorded with each nozzle relative to the center position of the common ruled line CR recorded with the reference nozzle #N0 (#7 in the example of FIG. 12), which is located on the most downstream side in the sub-scanning direction. In the upper equation, the negative sign is accordingly given to the second term on the right side $DIS_{r-N0}$.

The above description with regard to the dot recording position on the raster line is also applicable to the second dot record mode. In general, the recording position $SSR_{i,p}$ of the dot array on the p-$^{th}$ raster line in the sub-scanning direction in the i-$^{th}$ dot record mode is expressed by Equation (4) given below:

$$SSR_{i,p} = \Sigma_{i,p}(DSD_i) - DIS_{r-N0} \quad (4)$$

Here the first term on the right side $\Sigma_{i,p}(DSD_i)$ represents the summation of the feeding amounts of sub-scan DSD in the i-$^{th}$ dot record mode before the p-$^{th}$ raster line is recorded. The second term on the right side $DIS_{r-N0}$ represents the center position of the p-$^{th}$ raster line recorded with the r-$^{th}$ nozzle relative to the center position of the reference raster line recorded with the reference nozzle #N0 in the i-$^{th}$ dot record mode. At step S4a in the flowchart of FIG. 16, the displacement calculation unit 502 calculates the recording position $SSR_{i,p}$ of the dot array on each raster line in the sub-scanning direction according to Equation (4) given above. When there are a plurality of mode classes, each having a plurality of dot record modes as selectable options (see FIG. 4), the procedures of steps S4a through S7 are repeatedly executed to select one optimum dot record mode with regard to each mode class as in the case of the above embodiment.

Figure 19:
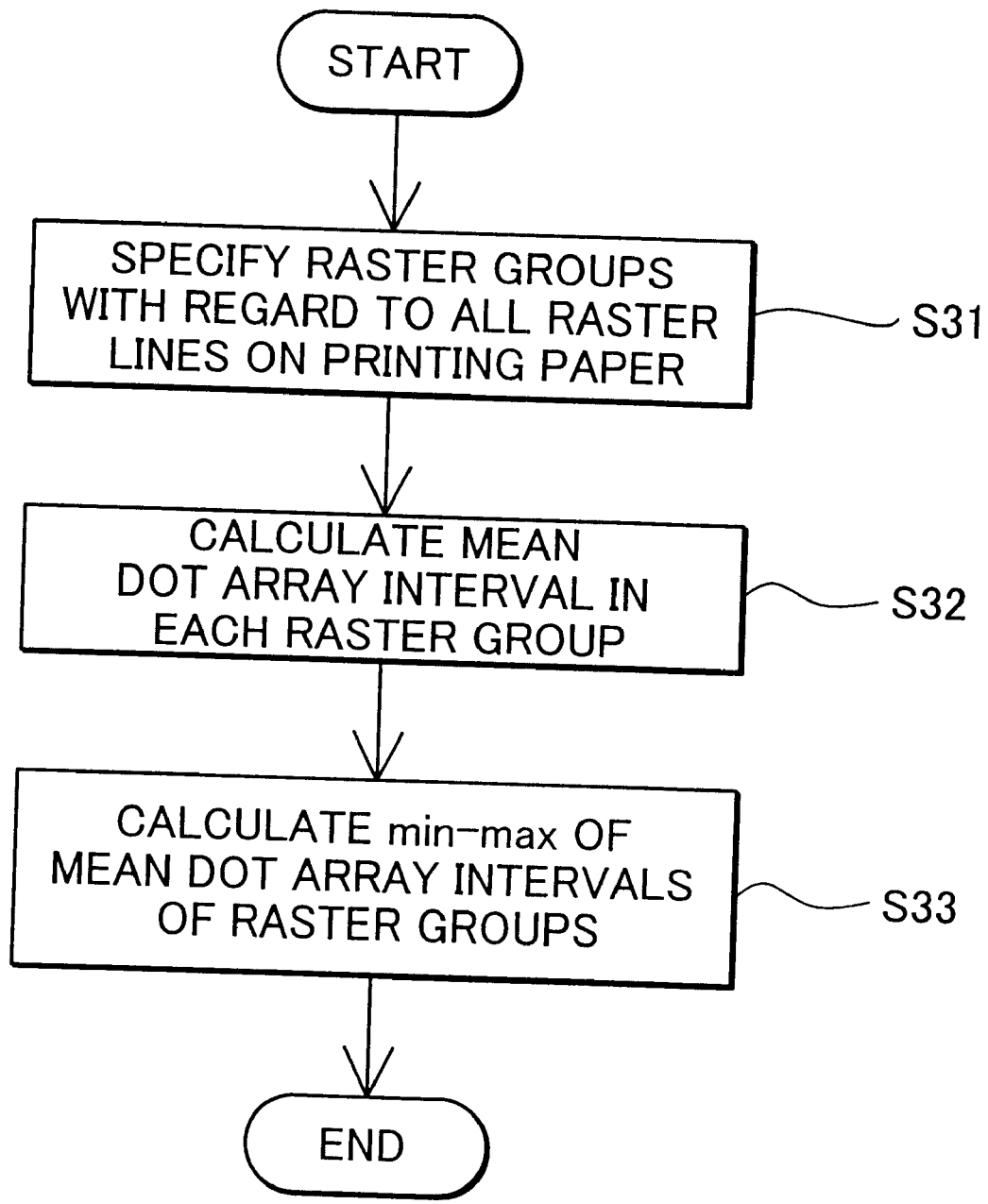
FIG. 19 is a flowchart showing the details of the process of calculating the evaluation value with regard to each dot record mode at step S5a in the flowchart of FIG. 16.
Figure 20:
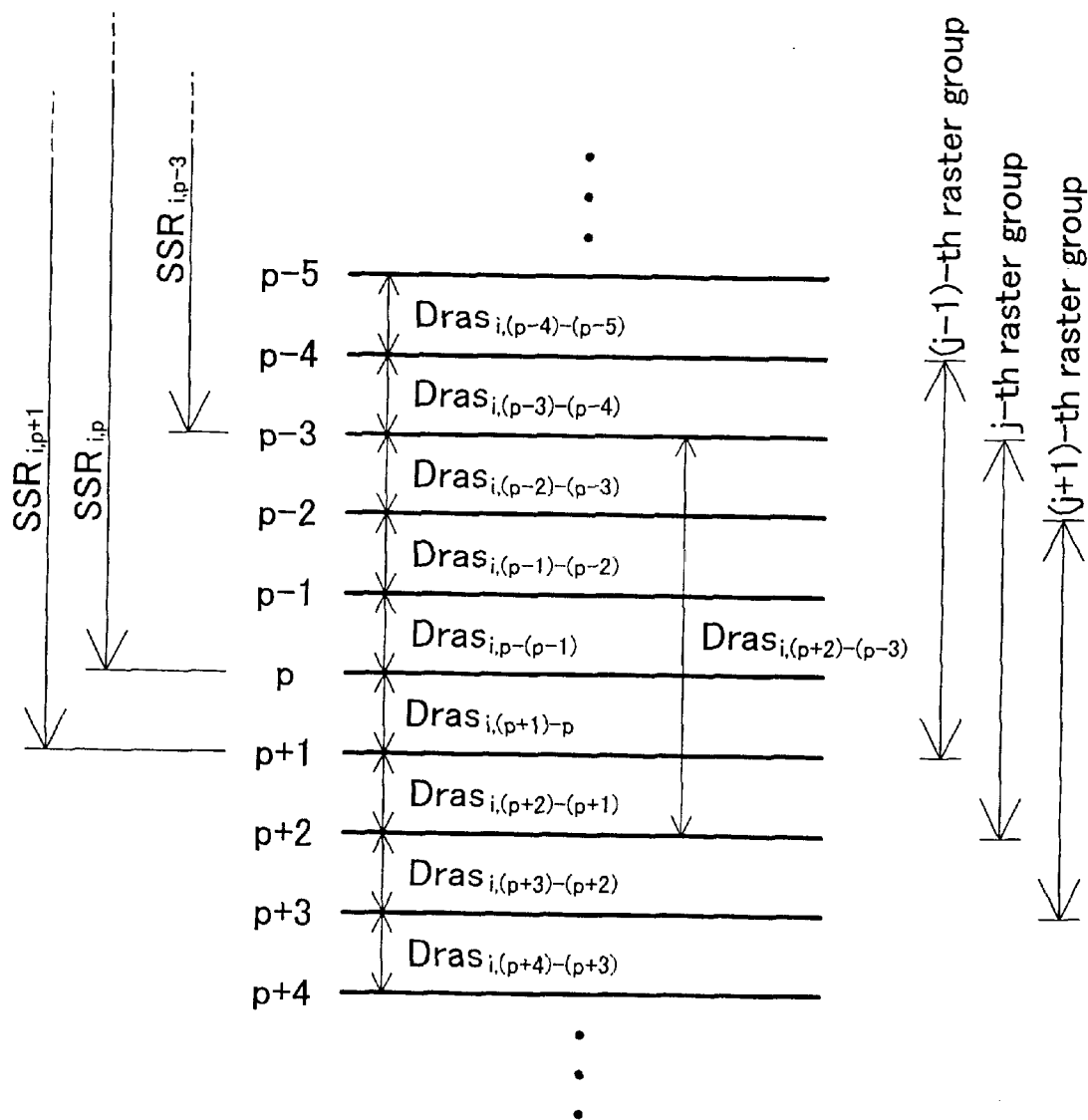
FIG. 20 shows the principle of calculating a dot array interval between adjoining raster lines as the evaluation value.

FIG. 19 is a flowchart showing the details of the process of calculating the evaluation value with regard to each dot record mode at step S5a in the flowchart of FIG. 16. FIG. 20 shows the principle of calculating the dot array interval between adjoining raster lines as the evaluation value. In the example of FIG. 20, the dot array recorded on each raster line is shown as the ruled line. Dot arrays of ten raster lines, that is, (p−5)-$^{th}$ to (p+4)-$^{th}$ raster lines, are shown in FIG. 20. At step S5a, the displacement calculation unit 502 calculates the evaluation value with regard to each dot record mode based on the recording positions of the dot arrays according to the procedures discussed below. When the program enters the routine of FIG. 19, the displacement calculation unit 502 first specifies raster groups of plural consecutive raster lines with regard to all the raster lines on the printing paper at step S31. For example, as shown in FIG. 20, each raster group may include six consecutive raster lines. The respective raster groups are specified by sequentially shifting the included raster lines by one.

The displacement calculation unit 502 subsequently calculates the mean dot array interval between adjoining raster lines included in each raster group at step S32. The dot array interval $Dras_{i,q-p}$ between the p-$^{th}$ raster line and the q-$^{th}$ raster line in the i-$^{th}$ dot record mode is expressed by Equation (5) given below. Here q>p.

$$Dras_{i,q-p} = SSR_{i,q} - SSR_{i,p} \quad (5)$$

In the example of FIG. 20, a j-$^{th}$ raster group includes (p−3)-$^{th}$ through (p+2)-$^{th}$ raster lines. The mean dot array interval $MDras_{i,j}$ in the j-$^{th}$ raster group is obtained by dividing the dot array interval $Dras_{i,(p+2)-(p-3)}$ between both the end raster lines, that is, the (p−3)-$^{th}$ raster line and the (p+2)-$^{th}$ raster line, by the number of intervals 5. The dot array interval $Dras_{i,q-p}$ is calculated according to Equation (5) given above. The mean dot array interval $MDras_{i,j}$ in the j-$^{th}$ raster group is accordingly expressed as Equation (6) given below:

$$MDras_{i,j} = (SSR_{i,p+2} - SSR_{i,p-3})/5 \quad (6)$$

When M denotes the aggregate number of raster lines included in each raster group and p0 denotes the number of the first raster line included in the j-$^{th}$ raster group (p−3 in Equation (6)), Equation (6) is rewritten as:

$$MDras_{i,j} = (SSR_{i,p0+M-1} - SSR_{i,p0})/(M-1) \quad (7)$$

The mode specification unit 522 calculates the mean dot array interval $MDras_{i,j}$ in each raster group according to Equation (7) given above at step S32 in the flowchart of FIG. 19.

At subsequent step S33, the mode specification unit 522 calculates a difference min-max($MDras_{i,j}$) between the largest and the smallest mean dot array intervals $MDras_{i,j}$ of the raster groups in each dot record mode. The difference min-max($MDras_{i,j}$) is specified as the evaluation value regarding the inter-ruled line distance in each dot record mode. Referring back to the flowchart of FIG. 16, at step S5a, the displacement calculation unit 502 calculates the evaluation value min-max($MDras_{i,j}$) in each record mode according to the above procedures.

At subsequent step S6a, the dot record mode having the smallest evaluation value min-max($MDras_{i,j}$) is selected. The banding occurs due to the variation in dot array interval between adjoining raster lines relative to the designed value. The method adopted here calculates the mean dot array interval in each raster group and selects the dot record mode having the smallest difference between the maximum mean dot array interval and the minimum mean dot array interval, that is, the dot record mode having little variation in dot array interval among different raster groups. This arrangement enables selection of the desired dot record mode having little chance of causing the banding.

In both the case of directly evaluating the displacement like the example of FIG. 10 and the case of evaluating the displacement based on the dot array interval like the example of FIG. 16, the evaluation value may be the difference between the maximum value and the minimum value, the variance, the standard deviation, or any of other appropriate values.

Figure 21:
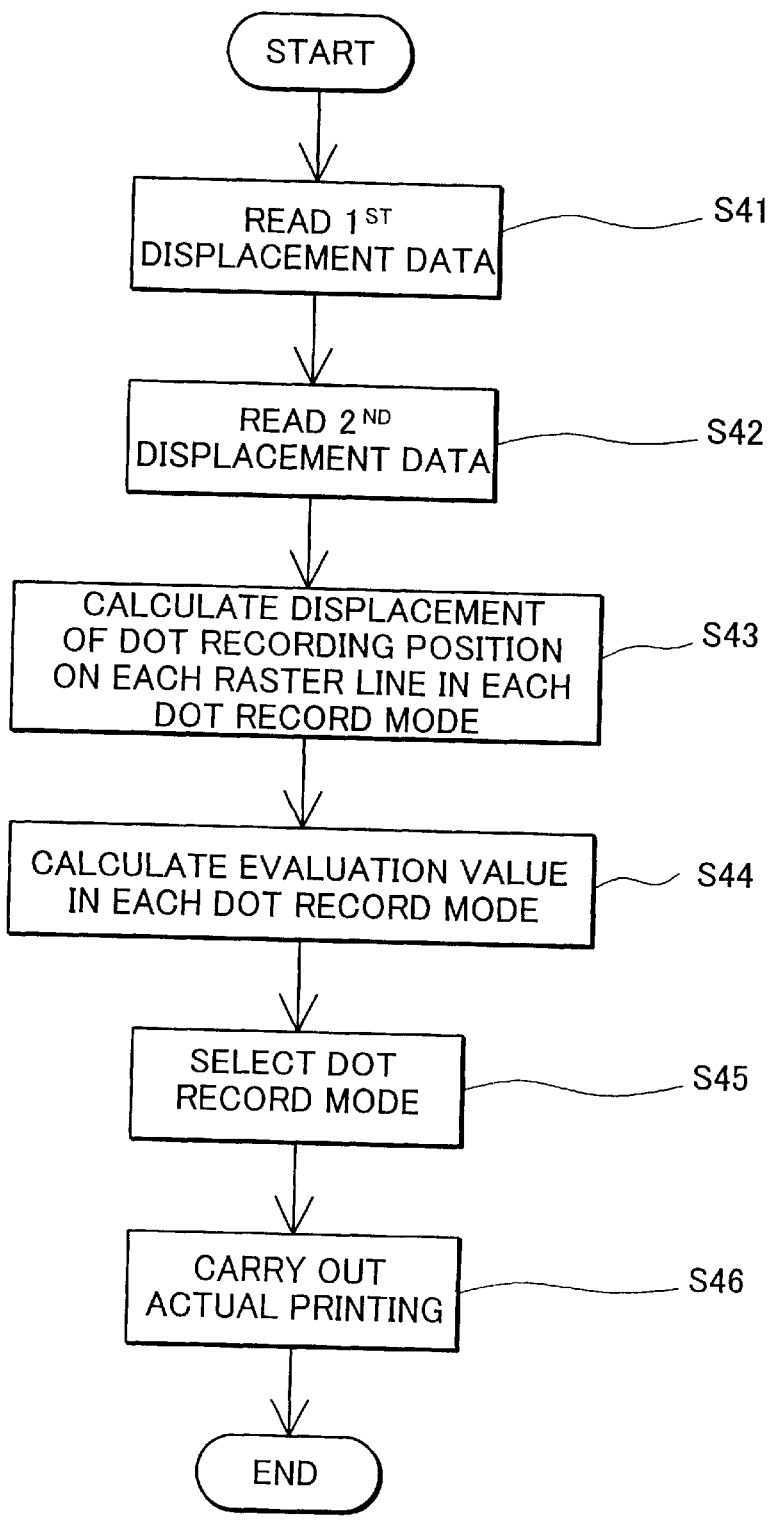
FIG. 21 is a flowchart showing a procedure of determining the dot record mode after attachment of the print head to the scan drive unit.
Figure 22:
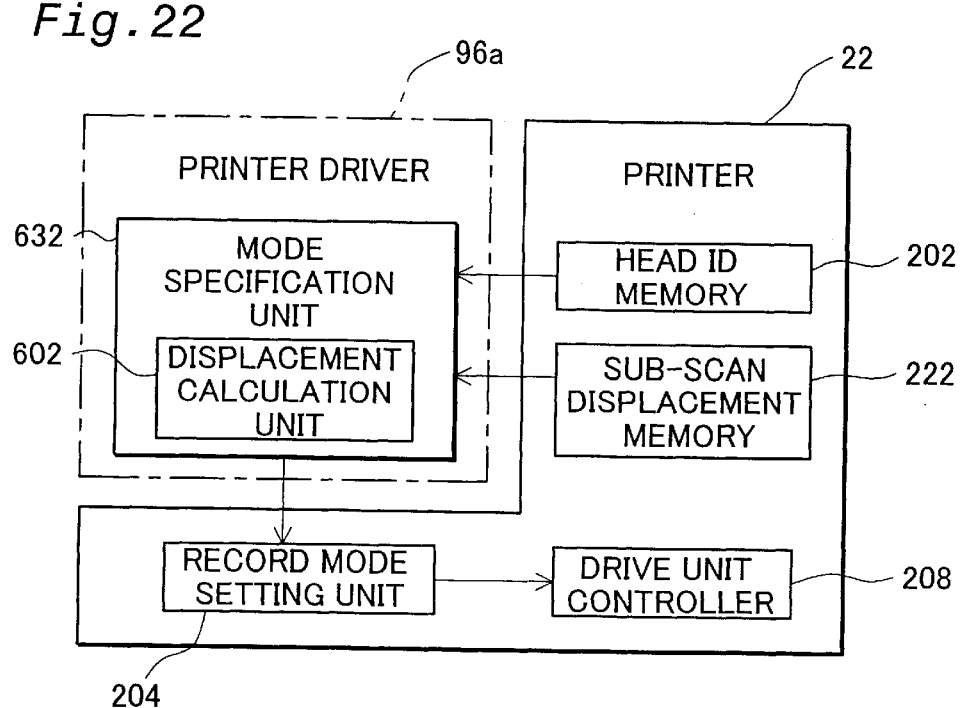
FIG. 22 is a block diagram showing the structure of another printer driver that includes a mode specification unit as a functional unit thereof.

E. Other Modifications (1) Application of Determining Dot Record Mode After Attachment of Print Head to Scan Drive Unit FIG. 21 is a flowchart showing a procedure of determining the dot record mode after attachment of the print head to the scan drive unit. FIG. 22 is a block diagram showing the structure of a printer driver 96a that includes a mode specification unit 632 as a functional unit thereof In the embodiment discussed above, the setting of the first displacement data (see FIG. 11), the setting of the second displacement data (see FIG. 13), and the selection of the dot record mode (see FIG. 10) are carried out in the course of manufacturing the printer. Any of these processes may alternatively be carried out after the attachment of the print head to the scan drive unit. For example, the selection of the dot record mode may be performed after the attachment of the print head to the scan drive unit according to the procedures discussed below. The procedure stores the first displacement data into the head ID memory 202 and the second displacement data into the sub-scan displacement memory 222 provided in the PROM 42 in the course of manufacturing the printer like the procedure of FIG. 10. The mode specification unit 632 included in the printer driver 96a has the equivalent functions to those of the mode specification unit 522 shown in FIG. 15. The other constituents of the printing apparatus are similar to those of the printing apparatus of the embodiment discussed above. The functional units in the printer driver 96a that are the same as the functional units in the printer driver 96 shown in FIG. 1 are omitted from the illustration of FIG. 22. When the program enters the routine of FIG. 21, the mode specification unit 632 first reads the first displacement data from the head ID memory 202 at step S41, and reads the second displacement data from the sub-scan displacement memory 222 at step S42. S42 may be carried out prior to S41. A displacement calculation unit 602, which corresponds to the displacement calculation unit 502 shown in FIG. 15, calculates the displacement of dot recording position on each raster line in each dot record mode at step S43. The mode specification unit 632 calculates the evaluation value in each dot record mode from the calculated displacement on the raster line at step S44, and selects the optimum dot record mode with regard to each mode class at step S45. After the above series of the processing, the drive unit controller 208 (see FIG. 4) controls the related units to implement printing at step S46. In the printing apparatus with a replaceable print head, this arrangement enables the desired dot record mode to be newly set in the printer after every replacement of the print head.

Figure 23:
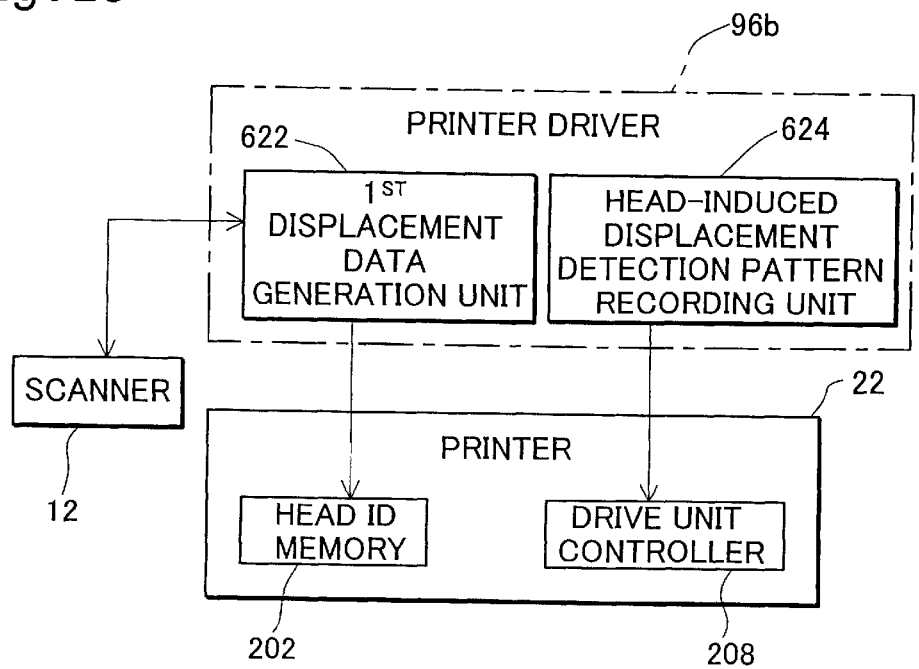
FIG. 23 is a block diagram showing the structure of still another printer driver that includes a first displacement data generation unit and a head-induced displacement detection pattern recording unit as functional units thereof.

(2) Application of Generating First Displacement Data After Attachment of Print Head to Scan Drive Unit FIG. 23 is a block diagram showing the structure of a printer driver 96b that includes a first displacement data generation unit 622 and a head-induced displacement detection pattern recording unit 624 as functional units thereof. The setting of the first displacement data shown in the flowchart of FIG. 11 may be carried out after the assembly of the printer. In this application, the first displacement data generation unit 622 and the head-induced displacement detection pattern recording unit 624 included in the printer driver 96b respectively have equivalent functions to those of the first displacement data generation unit 322 and the head-induced displacement detection pattern recording unit 324 shown in FIG. 12. These functional units execute the series of processing according to the procedures shown in the flowchart of FIG. 11. The functional units in the printer driver 96b that are the same as the functional units in the printer driver 96 shown in FIG. 1 are omitted from the illustration of FIG. 23. The general flow in this application replaces the contents of step S41 in the flowchart of FIG. 21 with "the process of generating the first displacement data". In the process of printing the ruled lines (the head-induced displacement detection pattern) at step S11 in the flowchart of FIG. 11, the head-induced displacement detection pattern recording unit 624 carries out only the main scan without the sub-scan to record dots and print the ruled lines. This application does not require the first displacement data to be stored in the print head 28 in advance.

Figure 24:
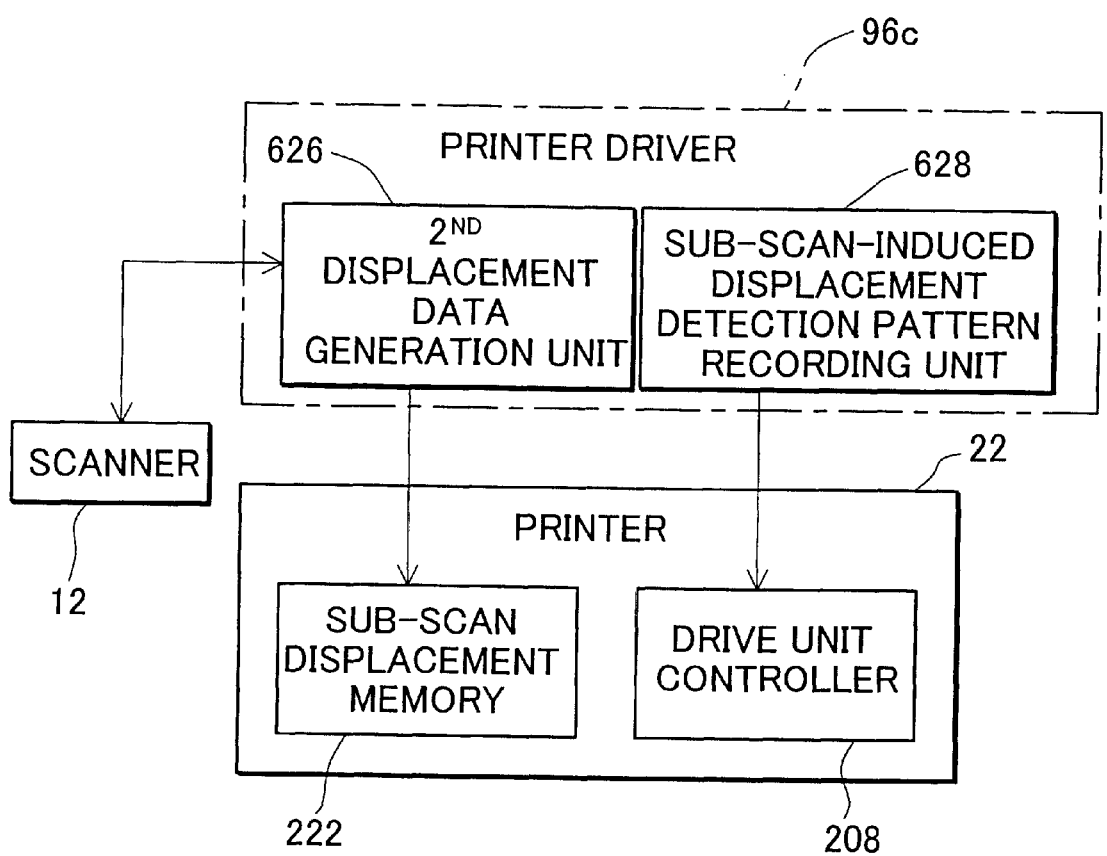
FIG. 24 is a block diagram showing the structure of another printer driver that includes a second displacement data generation unit and a sub-scan-induced displacement detection pattern recording unit as functional units thereof.

(3) Application of Generating Second Displacement Data After Attachment of Print Head to Scan Drive Unit FIG. 24 is a block diagram showing the structure of a printer driver 96c that includes a second displacement data generation unit 626 and a sub-scan-induced displacement detection pattern recording unit 628 as functional units thereof. The setting of the second displacement data shown in the flowchart of FIG. 13 may be carried out after the assembly of the printer. In this application, the second displacement data generation unit 626 and the sub-scan-induced displacement detection pattern recording unit 628 included in the printer driver 96c respectively have equivalent functions to those of the second displacement data generation unit 422 and the sub-scan-induced displacement detection pattern recording unit 424 shown in FIG. 14. These functional units execute the series of processing according to the procedures shown in the flowchart of FIG. 13. The functional units in the printer driver 96c that are the same as the functional units in the printer driver 96 shown in FIG. 1 are omitted from the illustration of FIG. 24. The general flow in this application replaces the contents of step S42 in the flowchart of FIG. 21 with "the process of generating the second displacement data." In the process of printing the ruled lines (the sub-scan-induced displacement detection pattern) at step S21 in the flowchart of FIG. 13, the sub-scan-induced displacement detection pattern recording unit 628 causes dots to be recorded with an identical nozzle in each pass of the main scan while causing one pass of the sub-scan set for each dot record mode to be carried out between adjoining passes of the main scan. This application enables the desired dot record mode to be newly set on every variation in sub-scan-induced displacement from the original settings.

(4) Other Applications

The generation of the first displacement data (see FIG. 11), the generation of the second displacement data (see FIG. 13), and the selection of the dot record mode (see FIGS. 10 and 21) may be carried out at various timings in the following stages, in addition to the above applications:

(a) in the stage of manufacturing the color printer 22; and (b) in the stage of using the color printer 22.

For example, the arrangement of causing the individual color printers 22 to undergo the series of processing shown in FIG. 10 or FIG. 21, FIG. 11, and FIG. 13 in the stage (a), that is, in the stage of manufacturing the color printer 22, enables the desired dot record mode attaining the high picture quality to be set in each color printer 22 before delivery. The performances of the color printer 22 vary with time. There is accordingly a possibility that the desired dot record mode attaining the high picture quality also varies with time. The arrangement of enabling the desired dot record mode to be newly set after the start of using the color printer 22 reduces the deterioration of the picture quality with time to some extent. From this point of view, the preferable arrangement enables the series of processing shown in FIG. 10 or FIG. 21, FIG. 11, and FIG. 13 to be carried out in the stage (b).

The procedure of the embodiment calculates and evaluates the displacement of dot recording position with regard to each raster line on the printing paper in each dot record mode, based on the first displacement data and the second displacement data. It is, however, not necessary to calculate the displacement of dot recording position with regard to all the raster lines on the printing paper. For example, one modified procedure evaluates the displacement of dot recording position in each dot record mode, based on the displacement data with regard to one selected number of raster lines. Another modified procedure calculates the displacement of dot recording position with regard to each of the raster lines recorded through a combination of sub-scan feeds set for each dot record mode and determines the evaluation value in the dot record mode. The restricted number of raster lines of interest, which are the object of the calculation, desirably relieves the loading of calculation.

The preferable application calculates and evaluates the displacements of dot recording positions on the raster lines with respect to nozzles for a plurality of different color inks in each dot record mode, although the above description regards the processing with respect to nozzles for one color ink. The procedure generates the first displacement data with regard to nozzles for plural colors at step S1, calculates the displacements of dot recording positions with regard to nozzles for the respective colors at step S4, and determines the evaluation values based on the calculated displacements of dot recording positions for the respective colors at step S5. One modified procedure selectively calculates and evaluates the displacement of dot recording position with regard to a specific color ink that makes the banding conspicuous. This arrangement desirably relieves the loading of the processing while effectively reduces the conspicuousness of the banding.

In the above embodiment and its modifications, the print mode selection information, which is used to select the desired dot record mode, is stored in the rewritable PROM 42. This arrangement causes the print mode selection information for specifying the desired dot record mode to be kept in the color printer 22, while enabling the print mode selection information to be rewritten according to the requirements.

The timing of reading the parameters of the desired dot record mode from the PROM 42 is not restricted to the time of installing the printer driver 96. But there may be many modifications. One modified application reads the parameters from the PROM 42 on every power supply to the computer 90. Even when the printer 22 connected to the computer 90 is replaced with a new one, this arrangement enables the parameters of the desired dot record mode to be read from the PROM 42 in the new printer 22. Another modified application reads the parameters from the PROM 42 on every execution of the printing operation (for example, in response to every user's printing instruction). This application is preferable in the case where a large number of printers of the identical model are connected to a network and the user selects one of such printers for the actual printing operation. The parameters of the desired dot record mode are read from the PROM 42 in the selected printer on every execution of the printing operation. This arrangement enables the printing operation to be carried out in the dot record mode suitable for the selected printer.

In the structure that all the dot record mode information is registered in advance in the printer driver 96, the printer driver 96 reads only the print mode selection information from the PROM 42. Here it is assumed that an error of reading the print mode selection information occurs, for example, due to a failure in bidirectional data communication. In this case, the printer driver 96 causes the printer 22 to print the print mode selection information (that is, the record mode number) on a printing medium, while requesting the user to input the printed print mode selection information (record mode number) on its user interface displayed on the screen of the computer 90. For example, a sentence like "Input printed record mode number through keyboard" is displayed in the user interface area on the screen. This arrangement enables the printer driver 96 to carry out various series of processing with the parameters of the dot record mode corresponding to the print mode selection information input by the user.

As described above, the procedure of the embodiment enables the desired dot record mode attaining the high picture quality to be selected among a plurality of dot record modes having at least the same resolution. This arrangement enables a high-quality image to be recorded according to the conditions of the individual color printer 22.

This advantage of recording the high-quality image according to the condition of the individual printer is especially prominent in the case where there are a plurality of equivalent dot record modes having different sequences of the feeding amounts of sub-scan L but the same resolution and recording speed like the first dot recording mode and the second dot recording mode at k=4 discussed above.

The above embodiment and its modifications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. Some examples of possible modification are discussed below. For example, the image sensor 320 may be incorporated in the printer 22 or in an image scanner or reader separate from the printer 22. The structure of incorporating the image sensor 320 in the printer 22 advantageously enables the recording position of the ruled line to be read in the course of printing the ruled line.

In one preferable application, an appropriate print head is selected among a plurality of print heads, which are attachable to one scan drive unit, based on the second displacement data of the scan drive unit and the first displacement data of the respective print heads. Even when the scan drive unit has significantly large errors of sub-scan feed, the combination of the scan drive unit with the suitable print head enables the scan drive unit to be used efficiently, thus attaining the effective use of the product. In a similar manner, an appropriate scan drive unit may be selected among a plurality of scan drive units, to which one print head is attachable, based on the first displacement data of the print head and the second displacement data of the respective scan drive units. This application enables even a print head having a significantly large displacement of dot recording position to be used efficiently.

The principle of the present invention is applicable to monochromatic printing as well as color printing. The technique of the present invention is also applicable to variable-dot printers that create a plurality of dots in each pixel to attain the multi-tone expression and to drum scan printers. In the drum scan printer, the rotating direction of the drum corresponds to the main scanning direction and the feeding direction of the carriage corresponds to the sub-scanning direction. The principle of the present invention is applicable to not only the ink jet printers but any dot recording apparatuses that record dots on the surface of a printing medium with a dot record head having an array of plural dot forming elements. The dot forming elements here represent elements used for creating dots, for example, nozzles in the ink jet printers.

The embodiment and its modifications are described on the assumption that ink is a liquid. The ink may be solidified at or below room temperature or may be softened or liquefied at room temperature. The ink jet printer generally has a temperature regulation mechanism that keeps the temperature of ink in a range of 30° C. to 70° C. to maintain the viscosity of ink in a stable ejection range. In any case, the technique of the present invention is applicable to the ink that is in the liquid state at the time of inputting the dot recording signals to the printer.

With a view to preventing evaporation of ink or utilizing the thermal energy in the printer for the change of ink from the solid state to the liquid state, the ink may be in the solid state at room temperature and liquefied under application of heat. The principle of the present invention is applicable to the ink that is liquefied under application of thermal energy in response to the input of the dot recording signals. Here the ink ejected in the liquid state may immediately be solidified on the printing medium. The ink may be accommodated in the liquid state or in the solid state in through holes or recesses of a porous sheet and be arranged opposite to a converter that converts electrical energy to thermal energy as disclosed in JP54-56847A and JP60-71260A. The technique of the present invention is especially effective for the ink that is liquefied under application of heat.

In the embodiment and its modified examples, part of the hardware configuration may be replaced by the software. On the contrary, part of the software may be replaced by the hardware configuration. For example, the functions of the control circuit 40 (see FIG. 2) in the color printer 22 may be executed by the computer 90. In this case, computer programs like the printer driver 96 actualize the functions of the control circuit 40.

The computer programs that attain the various functions are recorded in computer readable recording media, such as floppy disks and CD-ROMs. The computer 90 reads the computer programs from the recording media and transfers the computer programs to an internal storage device or an external storage device. The computer programs may alternatively be supplied to the computer 90 from a program supply unit via a communication path. The microcomputer in the computer 90 executes the computer programs stored in the internal storage device or the external storage device or directly executes the computer programs recorded in the recording media to attain the various functions.

In the specification hereof, the computer 90 is the concept including both the hardware structure and the operating system. Namely the computer represents the hardware structure working under the control of the operating system. The computer 90 executes various application programs to attain the functions discussed above. Part of such functions may be actualized by the operating system, instead of the application programs.

In the present invention, the computer readable recording media are not restricted to portable recording media, such as flexible disks and CD-ROMs, but includes a diversity of internal storage devices like a RAM and a ROM included in the computer and a diversity of external storage devices like a hard disk fixed to the computer. Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dot recording apparatus that records dots on a surface of a printing medium comprising:
   a dot record head having a plurality of dot forming elements, which are used to form dots;
   a main scan drive unit configured to carry out main scan, which shifts at least one of the dot record head and the printing medium in a main scanning direction;
   a sub-scan drive unit configured to carry out sub-scan, which shifts at least one of the dot record head and the printing medium in a sub-scanning direction perpendicular to the main scanning direction;
   a first storage unit configured to store first displacement data, the first displacement data substantially representing deviations of dot recording positions in the sub-scanning direction with respect to the plurality of dot forming elements from a reference dot recording position by a reference dot forming element selected among the plurality of dot forming elements;
   a second storage unit configured to store second displacement data, the second displacement data substantially representing feeding errors of the sub-scan in the sub-scanning direction;
   a record mode storage unit configured to store a plurality of dot record modes, each of the dot record modes specifying operations of the main scan and the sub-scan to record dots, the plurality of dot record modes having a same dot resolution and a substantially same recording speed but different combinations of feeding amounts for the sub-scan carried out in respective intervals of adjoining passes of the main scan; and
   a control unit configured to control the respective units,
   wherein the control unit comprises a selection unit that selects one dot record mode among the plurality of dot record modes stored in the record mode storage unit, based on the first displacement data and the second displacement data.

2. A dot recording apparatus in accordance with claim 1, wherein the dot record head is replaceable, and
   the first storage unit is provided on the dot record head.

3. A dot recording apparatus in accordance with claim 1, wherein the control unit controls the sub-scan drive unit, the main scan drive unit, and the dot record head to repeatedly carry out the sub-scan by a predetermined combination of feeding amounts in respective intervals of adjoining passes of the main scan, and thereby record dots on raster lines on the printing medium in each of the dot record modes,
   the control unit further comprises:
      a displacement calculation unit that calculates a sum of accumulated feeding errors of the sub-scan with respect to each raster line of interest before the raster line of interest on the printing medium is recorded and a deviation of a dot recording position in the sub-scanning direction by a dot forming element used for recording the raster line of interest from the reference dot recording position, and specifies the sum as a displacement of dot recording position on each raster line,
   the selection unit calculates an evaluation value relating to a variation in intervals of adjoining raster lines in the sub-scanning direction, based on the displacement of dot recording position on each raster line on the printing medium, and selects the dot record mode according to the evaluation value.

4. A dot recording apparatus in accordance with claim 3, wherein the displacement calculation unit calculates the displacement of dot recording position with regard to an equal number of raster lines in each of the dot record modes.

5. A dot recording apparatus in accordance with claim 3, wherein the displacement calculation unit calculates the displacement of dot recording position with regard to raster lines to be recorded while one set of the sub-scan is carried out by the combination of feeding amounts for each dot record mode.

6. A dot recording apparatus in accordance with claim 3, further comprises a sensor that reads a sub-scan-induced displacement detection pattern printed on the printing medium for the purpose of detecting a sub-scan-induced displacement in the sub-scanning direction,
   wherein the control unit comprises:
      a sub-scan-induced displacement detection pattern recording unit configured to control the sub-scan drive unit, the main scan drive unit, and the dot record head to record dots with an identical dot forming element in each pass of the main scan while carrying out the sub-scan by the combination of feeding amounts in respective intervals of the adjoining passes of the main scan, so as to record the sub-scan-induced displacement detection pattern in each dot record mode; and a second displacement data generation unit that generates the second displacement data, based on an output of the sensor.

7. A method of recording dots on a printing medium with a dot record head having a plurality of dot forming elements, which are used to form dots on the printing medium, by carrying out main scan and sub-scan, where the main scan shifts at least one of the dot record head and the printing medium in a main scanning direction and the sub-scan shifts at least one of the dot record head and the printing medium in a sub-scanning direction perpendicular to the main scanning direction, the method comprising the steps of:

(a) generating first displacement data, which substantially represents deviations of dot recording positions in the sub-scanning direction with respect to the plurality of dot forming elements from a reference dot recording position by a reference dot forming element selected among the plurality of dot forming elements;

(b) generating second displacement data, which substantially represents feeding errors of the sub-scan in the sub-scanning direction;

(c) selecting a dot record mode among a plurality of dot record modes, based on the first displacement data and the second displacement data, each of the dot record modes specifying operations of the main scan and the sub-scan to record dots, the plurality of dot record modes having a same dot resolution and a substantially same recording speed but different combinations of feeding amounts for the sub-scan carried out in respective intervals of adjoining passes of the main scan; and (d) carrying out the main scan and the sub-scan to record dots in the selected dot record mode.

8. A method in accordance with claim 7, wherein the step (d) comprising the step of carrying out the sub-scan repeatedly by a predetermined combination of feeding amounts in respective intervals of adjoining passes of the main scan, and thereby records dots on raster lines on the printing medium in the selected dot record mode, and the step (c) comprising the steps of:

(c1) calculating a sum of accumulated feeding errors of the sub-scan with respect to each raster line of interest before the raster line of interest on the printing medium is recorded and a deviation of a dot recording position in the sub-scanning direction by a dot forming element used for recording the raster line of interest from the reference dot recording position, and specifying the sum as a displacement of dot recording position on each raster line; and (c2) calculating an evaluation value relating to a variation in intervals of adjoining raster lines in the sub-scanning direction, based on the displacement of dot recording position on each raster line on the printing medium, and selecting the dot record mode according to the evaluation value.

9. A method in accordance with claim 8, wherein the step (c1) comprising the step of calculating the displacement of dot recording position with regard to an equal number of raster lines in each of the dot record modes.

10. A method in accordance with claim 8, wherein the step (c1) comprising the step of calculating the displacement of dot recording position with regard to raster lines to be recorded while one set of the sub-scan is carried out by the combination of feeding amounts for each dot record mode.

11. A method in accordance with claim 7, wherein the step (d) comprising the step of carrying out the sub-scan repeatedly by a predetermined combination of feeding amounts in respective intervals of adjoining passes of the main scan, and thereby records dots on raster lines on the printing medium in the selected dot record mode, and the step (b) comprising the steps of:

(b1) shifting the dot record head in a direction identical with the main scanning direction and recording dots with an identical dot forming element, while carrying out the sub-scan by the combination of feeding amounts in respective intervals of adjoining shifts, so as to record a sub-scan-induced displacement detection pattern in each dot record mode;

(b2) reading the sub-scan-induced displacement detection pattern with a sensor; and (b3) generating the second displacement data based on an output of the sensor.

12. A computer program product for selecting a dot record mode using a computer, the computer being connected with a dot recording apparatus, the dot recording apparatus being configured to record dots on a surface of a printing medium, the dot recording apparatus comprising: a dot record head having a plurality of dot forming elements, which are used to form dots, and a scan drive unit configured to carry out main scan and sub-scan, the main scan shifting at least one of the dot record head and the printing medium in a main scanning direction, the sub-scan shifting at least one of the dot record head and the printing medium in a sub-scanning direction perpendicular to the main scanning direction, the computer program product comprising:

a computer readable medium; and a computer program stored on the computer readable medium, the computer program comprising:

a first program for causing the computer to generate first displacement data, which substantially represents deviations of dot recording positions in the sub-scanning direction with respect to the plurality of dot forming elements in the sub-scanning direction from a reference dot recording position by a reference dot forming element selected among the plurality of dot forming elements;

a second program for causing the computer to generate second displacement data, which substantially represents feeding errors of the sub-scan in the sub-scanning direction;

a third program for causing the computer to select one dot record mode among a plurality of dot record modes, based on the first displacement data and the second displacement data, each of the dot record modes specifying operations of the main scan and the sub-scan to record dots, the plurality of dot record modes having a same dot resolution and a substantially same recording speed but different combinations of feeding amounts for the sub-scan carried out in respective intervals of adjoining passes of the main scan; and a fourth program for causing the computer to carries out the main scan and the sub-scan to record dots in the selected dot record mode.

13. A computer readable recording medium in accordance with claim 12, wherein the fourth program comprising a subprogram for carrying out the sub-scan repeatedly by a predetermined combination of feeding amounts in respective intervals of adjoining passes of the main scan, and thereby records dots on raster lines on the printing medium in the selected dot record mode, and the third program comprising:
- a first subprogram for calculating a sum of accumulated feeding errors of the sub-scan with respect to each raster line of interest before the raster line of interest on the printing medium is recorded and a deviation of a dot recording position in the sub-scanning direction by a dot forming element used for recording the raster line of interest from the reference dot recording position, and specifying the sum as a displacement of dot recording position on each raster line; and
- a second subprogram for calculating a evaluation value relating to a variation in intervals of adjoining raster lines in the sub-scanning direction, based on the displacement of dot recording position on each raster line on the printing medium, and selecting the dot record mode according to the evaluation value.

14. A computer readable recording medium in accordance with claim 13, wherein the first subprogram comprising a subprogram for calculating the displacement of dot recording position with regard to an equal number of raster lines in each of the dot record modes.

15. A computer readable recording medium in accordance with claim 13, wherein the first subprogram comprising a subprogram for calculating the displacement of dot recording position with regard to raster lines to be recorded while one set of the sub-scan is carried out by the combination of feeding amounts for each dot record mode.

16. A computer readable recording medium in accordance with claim 12, wherein the fourth program comprising a subprogram for carrying out the sub-scan repeatedly by a predetermined combination of feeding amounts in respective intervals of adjoining passes of the main scan, and thereby records dots on raster lines on the printing medium in the selected dot record mode, and the second program comprising:
- a subprogram for shifting the dot record head in a direction identical with the main scanning direction and recording dots with an identical dot forming element, while carrying out the sub-scan by the combination of feeding amounts in respective intervals of adjoining shifts, so as to record a sub-scan-induced displacement detection pattern in each dot record mode;
- a subprogram for reading a sub-scan-induced displacement detection pattern with a sensor; and
- a subprogram for generating the second displacement data based on an output of the sensor.

17. A method of manufacturing a printing apparatus by combining a dot record head with a scan drive unit, the dot record head having a plurality of dot forming elements, which are used to form dots on a printing medium, the scan drive unit carrying out main scan and sub-scan, where the main scan shifts at least one of the dot record head and the printing medium in a main scanning direction and the sub-scan shifts at least one of the dot record head and the printing medium in a sub-scanning direction perpendicular to the main scanning direction, the method comprising the steps of:
- (a) generating first displacement data, which substantially represents deviations of dot recording positions in the sub-scanning direction with respect to the plurality of dot forming elements from a reference dot recording position by a reference dot forming element selected among the plurality of dot forming elements;
- (b) generating second displacement data, which substantially represents feeding errors of the sub-scan in the sub-scanning direction;
- (c) attaching the dot record head to the scan drive unit;
- (d) selecting a dot record mode among a plurality of dot record modes, based on the first displacement data and the second displacement data, each of the dot record modes specifying operations of the main scan and the sub-scan to record dots, the plurality of dot record modes having a same dot resolution and a substantially same recording speed but different combinations of feeding amounts for the sub-scan carried out in respective intervals of adjoining passes of the main scan; and
- (e) storing the selected dot record mode in a third storage unit provided in the printing apparatus.

18. A method in accordance with claim 17, wherein the printing apparatus repeatedly carries out the sub-scan by a predetermined combination of feeding amounts in respective intervals of adjoining passes of the main scan, and thereby records dots on raster lines on the printing medium in each of the dot record modes, and the step (d) comprising the steps of:
- (d1) calculating a sum of accumulated feeding errors of the sub-scan with respect to each raster line of interest before the raster line of interest on the printing medium is recorded and a deviation of a dot recording position in the sub-scanning direction by a dot forming element used for recording the raster line of interest from the reference dot recording position, and specifying the sum as a displacement of dot recording position on each raster line; and
- (d2) calculating a evaluation value relating to a variation in intervals of adjoining raster lines in the sub-scanning direction, based on the displacement of dot recording position on each raster line on the printing medium, and selecting the dot record mode according to the evaluation value.

19. A method in accordance with claim 18, wherein the step (d1) comprising the step of calculating the displacement of dot recording position with regard to an equal number of raster lines in each of the dot record modes.

20. A method in accordance with claim 18, wherein the step (d1) comprising the step of calculating the displacement of dot recording position with regard to raster lines to be recorded while one set of the sub-scan is carried out by the combination of feeding amounts for each dot record mode.

21. A method in accordance with claim 17, wherein the printing apparatus repeatedly carries out the sub-scan by a predetermined combination of feeding amounts in respective intervals of adjoining passes of the main scan, and thereby records dots on raster lines on the printing medium in each of the dot record modes, and the step (b) comprising the steps of:
- (b1) shifting the dot record head in a direction identical with the main scanning direction and recording dots with an identical dot forming element, while carrying out the sub-scan by the combination of feeding amounts in respective intervals of adjoining shifts, so as to record a sub-scan-induced displacement detection pattern in each dot record mode;
- (b2) reading a sub-scan-induced displacement detection pattern with a sensor; and
- (b3) generating the second displacement data based on an output of the sensor.

22. A method in accordance with claim 17, wherein the step (a) comprising the steps of:
  (a1) driving each of the dot forming elements while shifting the dot record head in a direction identical with the main scanning direction, so as to print a head-induced displacement detection pattern;
  (a2) reading the head-induced displacement detection pattern with a sensor; and
  (a3) generating the first displacement data based on an output of the sensor.

* * * * *